(12) United States Patent
Xue et al.

(10) Patent No.: US 12,199,781 B2
(45) Date of Patent: Jan. 14, 2025

(54) NESTED SUB-POOLS FOR PHYSICAL SIDELINK FEEDBACK CHANNEL

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/333,643

(22) Filed: May 28, 2021

(65) Prior Publication Data

US 2022/0393807 A1 Dec. 8, 2022

(51) Int. Cl.
*H04L 1/1867* (2023.01)
*H04L 1/1812* (2023.01)
*H04W 72/23* (2023.01)

(52) U.S. Cl.
CPC .......... *H04L 1/1893* (2013.01); *H04L 1/1812* (2013.01); *H04W 72/23* (2023.01)

(58) Field of Classification Search
CPC ... H04L 1/1893; H04L 1/1812; H04L 5/0007; H04L 5/0023; H04L 5/0053; H04L 5/0094; H04L 5/0055; H04W 72/23; H04B 7/00
See application file for complete search history.

(56) References Cited

U.S. PATENT DOCUMENTS

| 10,993,141 | B2* | 4/2021 | Huang | H04W 72/1263 |
| 2021/0144750 | A1* | 5/2021 | Cao | H04W 72/0453 |
| 2021/0204268 | A1* | 7/2021 | Hassan Hussein | H04W 72/543 |
| 2021/0266951 | A1* | 8/2021 | Gulati | H04B 17/382 |
| 2022/0094472 | A1* | 3/2022 | Hwang | H04L 5/0033 |
| 2022/0201654 | A1* | 6/2022 | Lee | H04L 1/1864 |
| 2022/0394702 | A1* | 12/2022 | Lee | H04L 1/1812 |
| 2022/0400467 | A1* | 12/2022 | Liu | H04L 5/0037 |
| 2023/0136864 | A1* | 5/2023 | Lei | H04L 5/0055 370/329 |

* cited by examiner

*Primary Examiner* — Benjamin H Elliott, IV
*Assistant Examiner* — Yewon Kim
(74) *Attorney, Agent, or Firm* — Procopio, Cory, Hargreaves & Savitch

(57) ABSTRACT

The apparatus may be a UE configured to select, from a plurality of PSFCH resource sub-pools of a PSFCH resource pool for receiving HARQ feedback, a particular PSFCH resource sub-pool for receiving HARQ feedback associated with a particular SL transmission; transmit, to at least one UE, a PSRI identifying the particular PSFCH resource sub-pool; and receive, from the at least one UE, HARQ feedback regarding the particular SL transmission, the HARQ feedback being received via resources in the PSFCH resource sub-pool indicated by the PSRI. The apparatus may be a base station in a Mode 1 resource allocation that may select, from a plurality of PSFCH resource sub-pools of a PSFCH resource pool for receiving HARQ feedback, a particular PSFCH resource sub-pool for receiving HARQ feedback associated with the particular SL transmission and transmit, to a UE, a PSRI identifying the particular PSFCH resource sub-pool.

30 Claims, 23 Drawing Sheets

NESTED SUB-POOLS FOR PHYSICAL SIDELINK FEEDBACK CHANNEL

TECHNICAL FIELD

The present disclosure relates generally to communication systems, and more particularly, to sidelink (SL) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some aspects of SL communication include transmitting hybrid automatic repeat request (HARQ) feedback in response to a SL transmission. A time-and-frequency resource for transmitting HARQ feedback may be selected by a receiving device based on an 8-bit layer (L1) source identifier (ID) associated with a source of a SL transmission. Resource allocation for SL transmission, in some aspects, allows for spatial reuse of time-and-frequency resources. If two source devices happen to have a same L1 source ID and be within range of a device that responds with HARQ feedback to the other device, there may be a HARQ collision (e.g., both HARQ feedback transmissions being sent via a same time-and-frequency resource). The probability of a HARQ collision for spatially reused resources may be $$\frac{1}{\text{Min}(256, N)},$$

where 256 is the number of unique 8-bit L1 source IDs and N is a number of selectable resources for transmitting HARQ feedback. It may be beneficial to avoid or minimize HARQ collisions.

In an aspect of the disclosure, a method, a computer-readable medium, and an apparatus are provided. The apparatus may be a device at a user equipment (UE). The device may be a processor and/or modem at a UE or the UE itself. The UE may be configured to select, from a plurality of physical SL feedback channel (PSFCH) resource sub-pools of a PSFCH resource pool for receiving HARQ feedback, a particular PSFCH resource sub-pool for receiving HARQ feedback associated with a particular SL transmission; transmit, to at least one UE, a PSFCH sub-pool resource indication (PSRI) identifying the particular PSFCH resource sub-pool; and receive, from the at least one UE, HARQ feedback regarding the particular SL transmission, the HARQ feedback being received via resources in the PSFCH resource sub-pool indicated by the PSRI. The UE may further be configured to receive configuration information indicating the plurality of PSFCH resource sub-pools. Selecting the particular PSFCH resource sub-pool may include transmitting, to a base station, a request for a resource allocation for (1) the particular SL transmission and (2) a corresponding HARQ feedback; and receiving, from the base station via a L1 signal, resource allocation information indicating the particular PSFCH resource sub-pool. The UE may be configured to receive a virtual L1 source; transmit, to at least one UE, an indication of the virtual L1 source ID; and receive, from the at least one UE, HARQ feedback regarding a particular SL transmission, the HARQ feedback being received via resources based on the virtual L1 source ID.

In an aspect of the disclosure, a method, a computer-readable medium, and an apparatus are provided. The apparatus may be a device at a UE. The device may be a processor and/or modem at a UE or the UE itself. The UE may be configured to receive, from a transmitting UE, a PSRI identifying a particular PSFCH resource sub-pool of a PSFCH resource pool for receiving HARQ feedback, the PSRI associated with a particular SL transmission from the transmitting UE; select a resource in the PSFCH resource sub-pool indicated by the PSRI for transmitting HARQ feedback associated with the particular SL transmission; and transmit, to the transmitting UE, the HARQ feedback via the selected resources. The UE may further be configured to receive configuration information indicating the plurality of PSFCH resource sub-pools. The UE may further be configured to receive a L1 source ID associated with the UE transmitting the particular SL transmission, where selecting the resource in the PSFCH resource sub-pool is based on a hashing function based on (1) the PSRI, (2) the received L1 source ID, and (3) a value associated with the UE. In some aspects the received L1 source ID is a virtual L1 source ID.

In an aspect of the disclosure, a method, a computer-readable medium, and an apparatus are provided. The apparatus may be a device at a base station. The device may be a processor and/or modem at a base station or the base station itself. The base station may be configured to receive, from a UE, a request for a resource allocation for (1) a particular SL transmission and (2) a corresponding HARQ feedback; select, from a plurality of PSFCH resource sub-pools of a PSFCH resource pool for receiving HARQ feedback, a particular PSFCH resource sub-pool for receiving HARQ feedback associated with the particular SL transmission; and transmit, to a UE, a PSRI identifying the particular PSFCH resource sub-pool. The base station may further be configured to configure a plurality of PSFCH resource sub-pools and transmit, to at least one UE, configuration information indicating the plurality of PSFCH resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
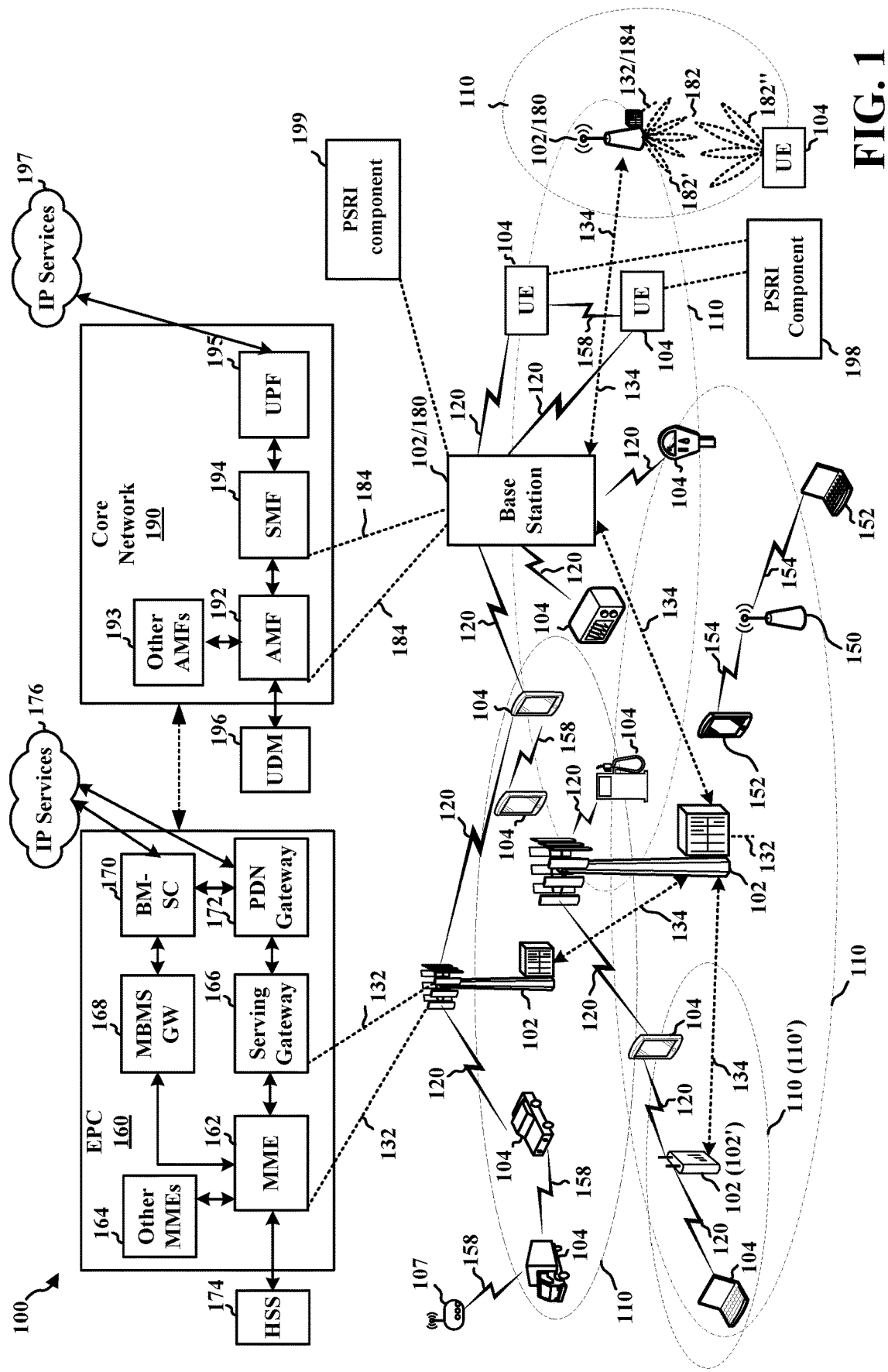
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, the UE 104, or other device communicating based on sidelink, may include a PSRI component 198 configured to select, from a plurality of PSFCH resource sub-pools of a PSFCH resource pool for receiving HARQ feedback, a particular PSFCH resource sub-pool for receiving HARQ feedback associated with a particular SL transmission; transmit, to at least one UE, a PSRI identifying the particular PSFCH resource sub-pool; and receive, from the at least one UE, HARQ feedback regarding the particular SL transmission, the HARQ feedback being received via resources in the PSFCH resource sub-pool indicated by the PSRI. In certain aspects, the PSRI component 198 may be configured to receive, from a transmitting UE, a PSRI identifying a particular PSFCH resource sub-pool of a PSFCH resource pool for receiving HARQ feedback, the PSRI associated with a particular SL transmission from the transmitting UE; select a resource in the PSFCH resource sub-pool indicated by the PSRI for transmitting HARQ feedback associated with the particular SL transmission; and transmit, to the transmitting UE, the HARQ feedback via the selected resources. In certain aspects, the base station 180 may include a PSRI component 199 configured to receive, from a UE, a request for a resource allocation for (1) a particular SL transmission and (2) a corresponding HARQ feedback; select, from a plurality of PSFCH resource sub-pools of a PSFCH resource pool for receiving HARQ feedback, a particular PSFCH resource sub-pool for receiving HARQ feedback associated with the particular SL transmission; and transmit, to a UE, a PSRI identifying the particular PSFCH resource sub-pool. Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
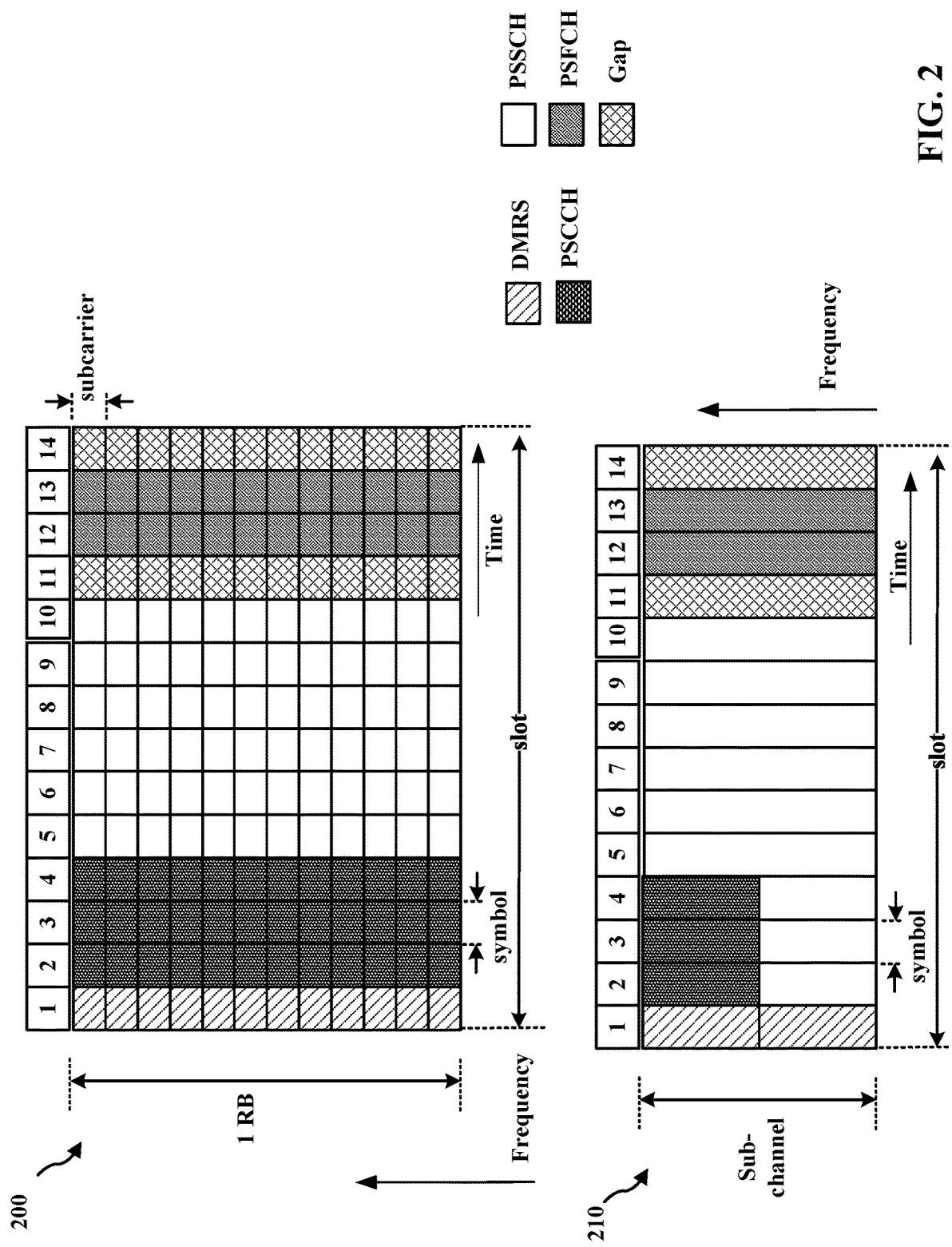
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where pt is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
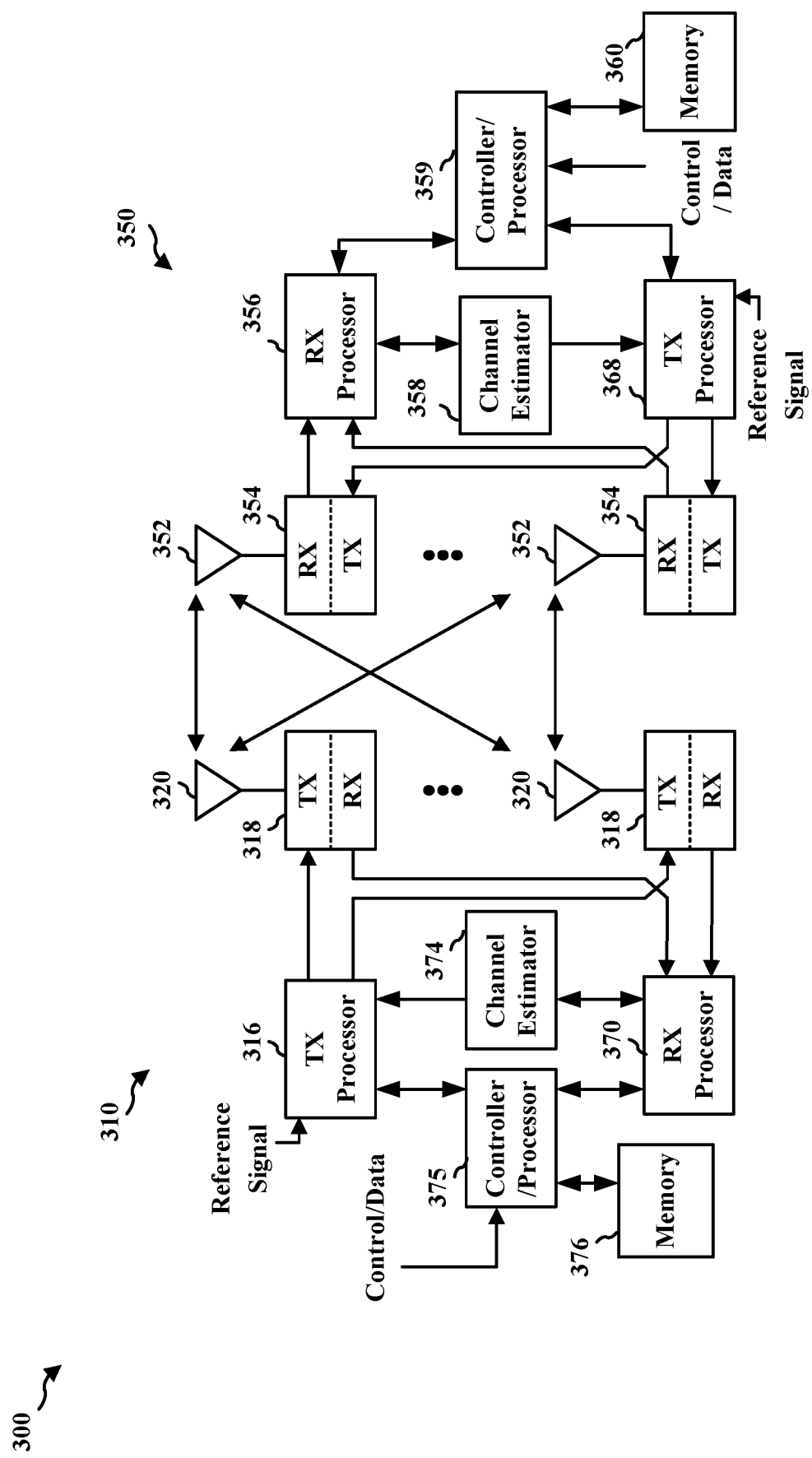
FIG. 3 is a diagram illustrating an example of a first device and a second device involved in wireless communication based, e.g., on sidelink.

FIG. 3 is a block diagram 300 of a first wireless communication device 310 in an access network in communication with a second wireless communication device 350 in the access network based on sidelink. In some examples, the devices 310 and 350 may communicate based on V2X or other D2D communication. The communication may be based on sidelink using a PC5 interface. The devices 310 and the 350 may comprise a UE, an RSU, a base station, etc., in the access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
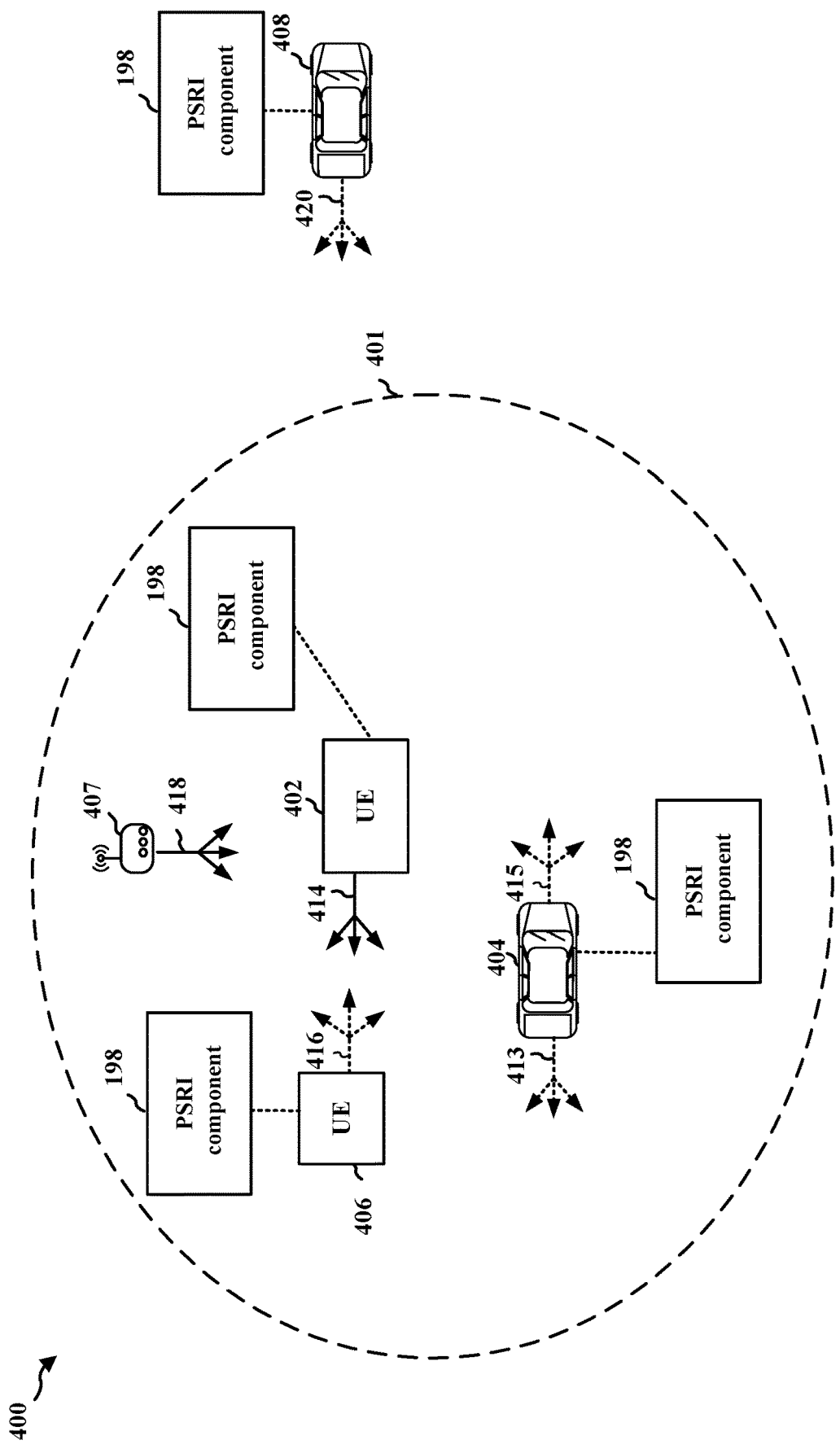
FIG. 4 is a diagram illustrating example aspects of sidelink communication between devices, in accordance with aspects presented herein.

FIG. 4 is a diagram 400 illustrating example aspects of sidelink communication between devices. The communication may be based on a slot structure comprising aspects described in connection with FIG. 2. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI) in a first-stage SCI (SCI-1) or a second-stage SCI (SCI-2)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast (e.g., groupcast) to nearby devices. For example, UE 404 may transmit transmissions 413, 415 intended for receipt by other UEs within a range 401 of UE 404, and UE 406 may transmit transmission 416. Additionally, or alternatively, RSU 407 may receive communication from and/or transmit communication 418 to UEs 402, 404, 406, 408. One or more of the UEs 402, 404, 406, 408 or the RSU 407 may include a PSRI component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
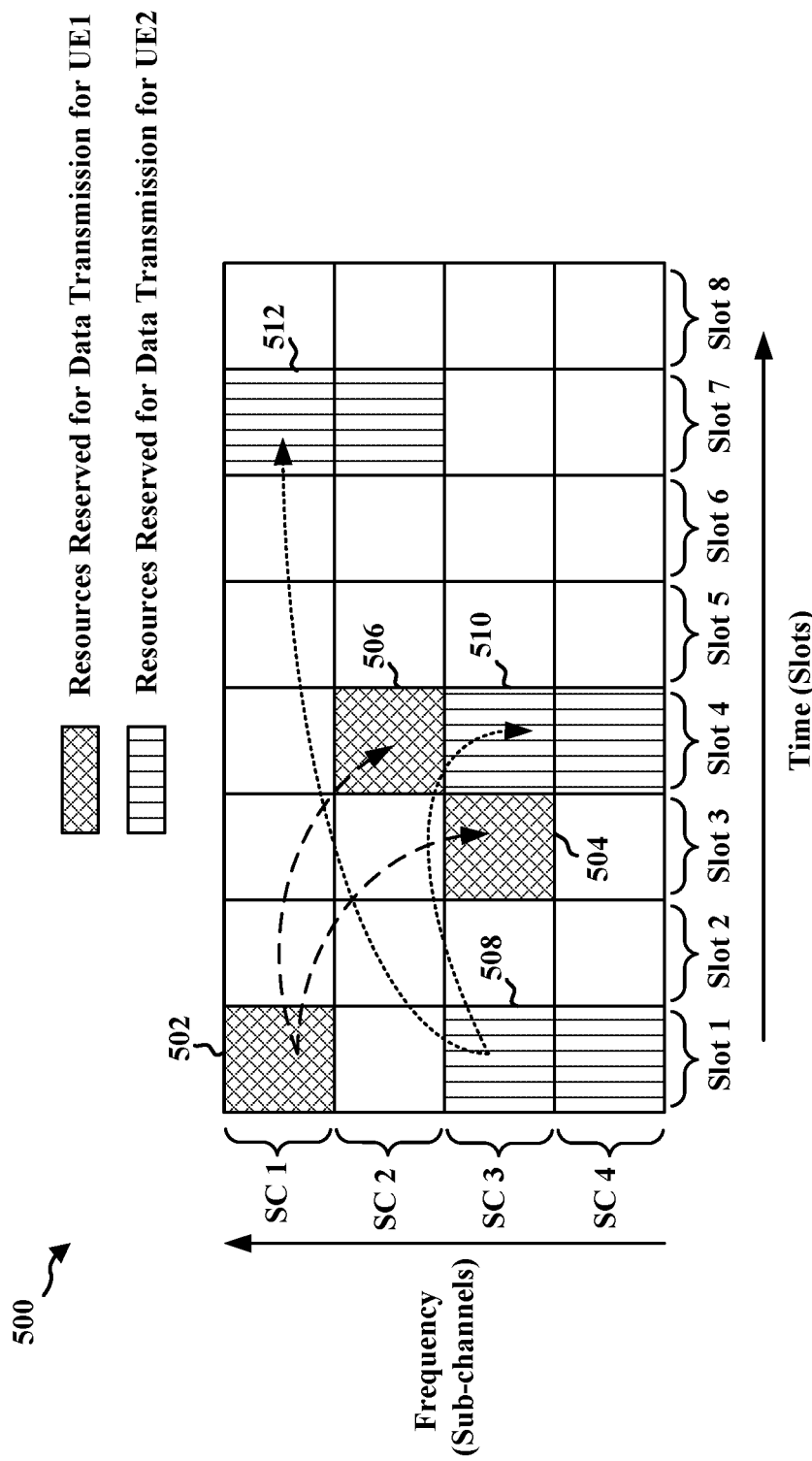
FIG. 5 is a diagram illustrating examples of resource reservation for sidelink communication.

FIG. 5 is a diagram 500 illustrating example of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in diagram 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

Figure 6:
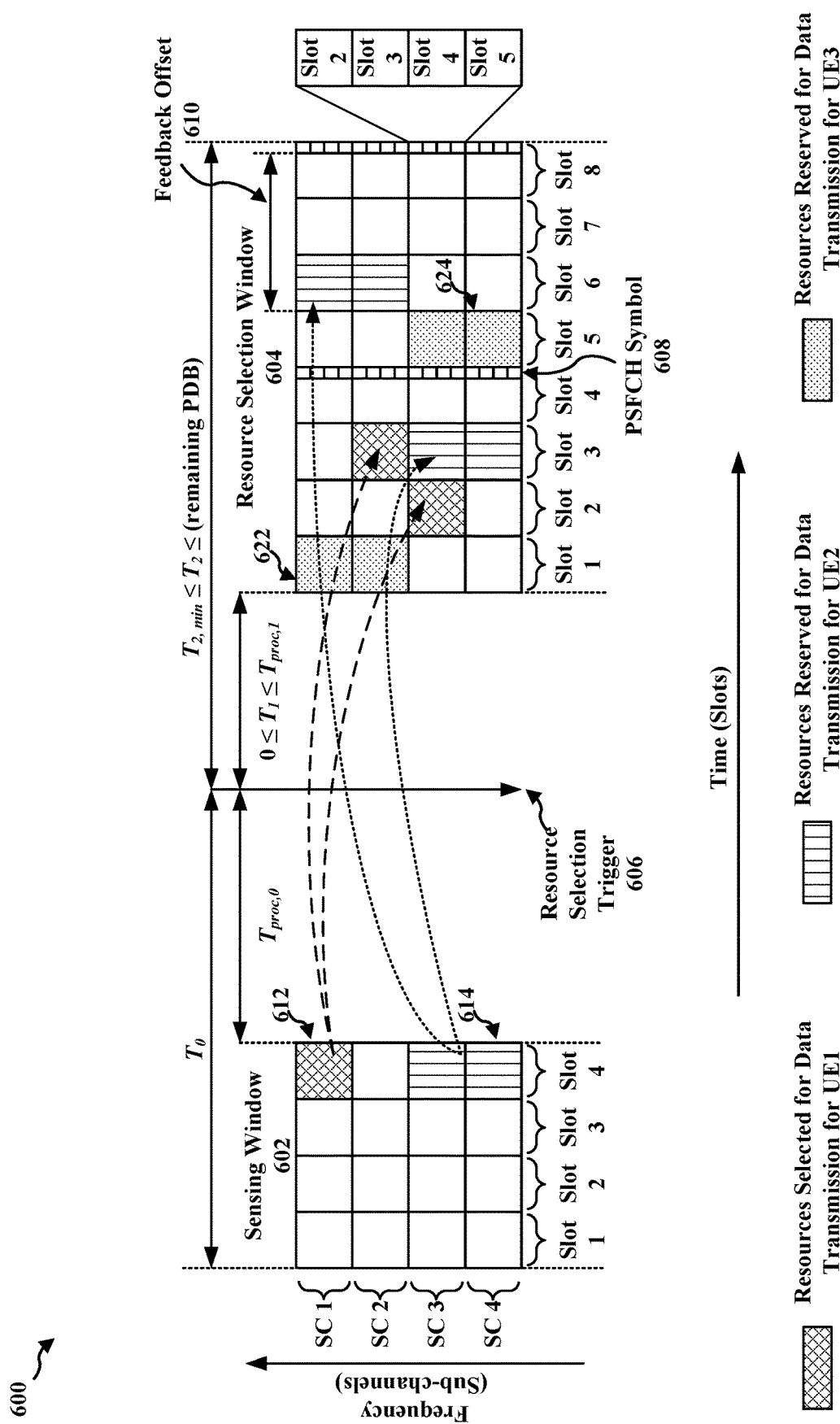
FIG. 6 is a diagram illustrating that a UE may consider resources reserved by other UEs before selecting resources for transmitting SL data.

FIG. 6 is a diagram 600 illustrating that a third UE ("UE3") may consider resources reserved by other UEs before selecting resources for transmitting SL data. UE3 may first decode SCI (e.g., SCI transmitted within the sensing window 602) to identify which resources are available (e.g., candidate resources). For example, UE3 may exclude the resources reserved by UE1 and UE2 and may select other available sub-channels and time slots from the candidate resources for its transmission (e.g., SC 1 and SC 2 and time slot 2 of diagram 600) and retransmissions (e.g., SC 3 and SC 4 and time slot 6 of diagram 600), which may be based on a number of adjacent sub-channels in which the data (e.g., packet) to be transmitted can fit. While FIG. 6 illustrates resources being reserved for an initial transmission and a single retransmission, the reservation may be for an initial transmission and two transmissions or for an initial transmission.

The UE (e.g., UE3) may determine an associated signal measurement (such as RSRP) for each resource reservation (e.g., reservations 612 and 614) received from another UE (e.g., UE1 or UE2). The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs, e.g., during sensing window 602, and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 6, the UE may transmit SCI reserving resources for data transmissions 622 and 624.

There may be a timeline for a sensing-based resource selection. For example, the UE may sense and decode the SCI received from other UEs during a sensing window 602, e.g., a time duration prior to resource selection. Based on the sensing history during the sensing window 602, the UE may be able to maintain a set of available candidate resources by excluding resources that are reserved by other UEs from the set of candidate resources. A UE may select resources (at a time indicated by resource selection trigger 606) from its set of available candidate resources and may transmit SCI reserving the selected resources for sidelink transmission (e.g., a PSSCH transmission) by the UE. There may be a time gap between the UE's selection of the resources and the UE transmitting SCI reserving the resources. In some aspects, each resource in resource selection window 604 is associated with a set of PSFCH resources (e.g., in PSFCH symbol 608) that is at least a feedback offset time 610 (e.g., 3 slots) after the SL transmission, as will be explained below in relation to FIG. 7.

Figure 7:
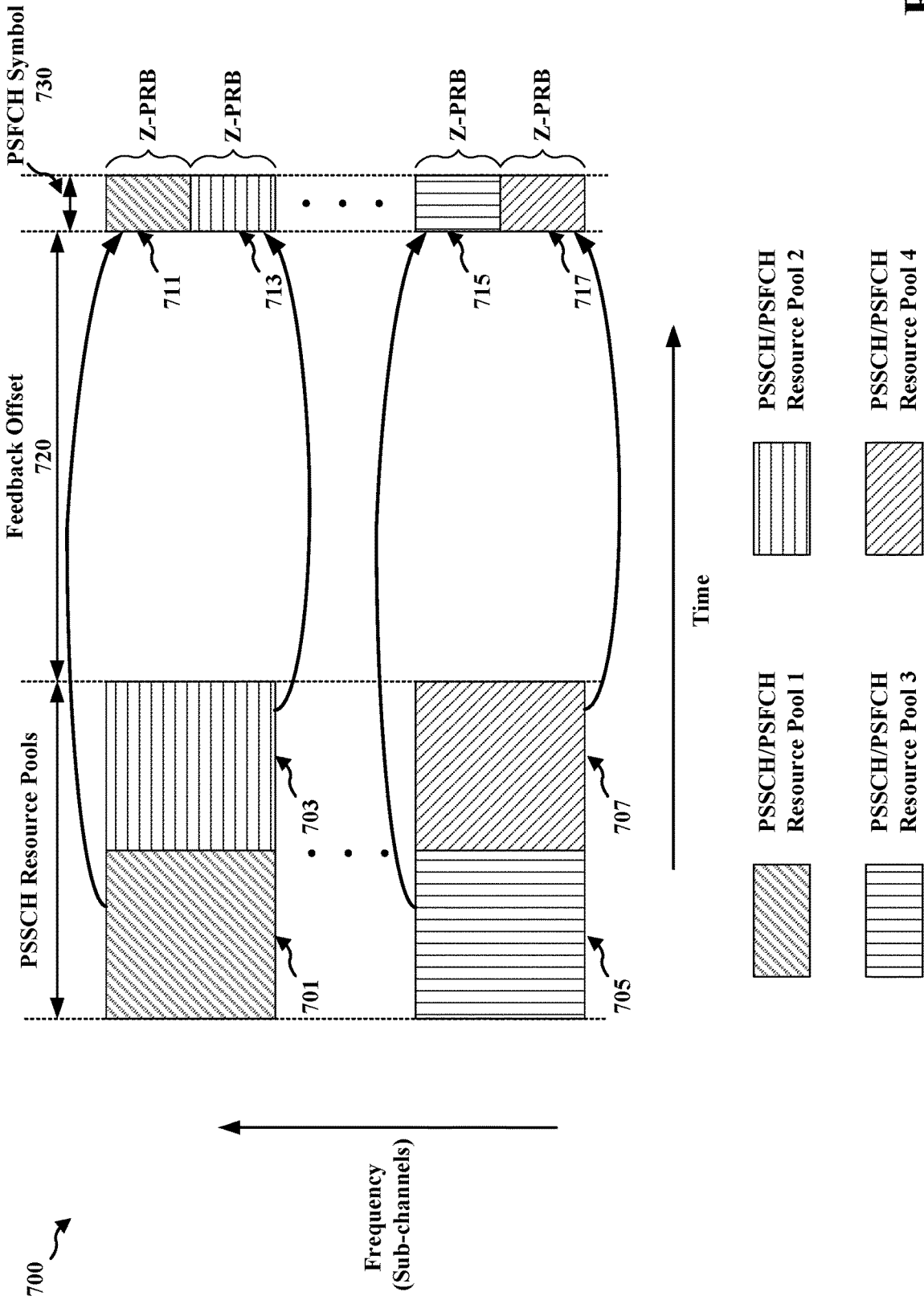
FIG. 7 is a diagram illustrating an example association between PSSCH resource pools and a set of PSFCH resource pools for transmitting and/or receiving HARQ feedback.

FIG. 7 is a diagram 700 illustrating an example association between PSSCH resource pools 701-707 and a set of PSFCH resource pools 711-717 for transmitting and/or receiving HARQ feedback. Diagram 700 illustrates a set of PSSCH resource pools 701-707 that are associated with a set of PSFCH resource pools 711-717, respectively. The PSFCH resources 711/713 and/or 715/717 may be within a same subchannel as the associated PSSCH resource pool 701/703 and/or 705/707 and may be separated in time by at least a feedback offset 720. Each PSFCH resource pool 711-717 in the PSFCH symbol 730 may include a set of "Z" PRBs within the subchannel. In some aspects, Z is determined by dividing a number of PRBs within the subchannel by the number of PSSCH resource pools (e.g., slots) associated with a particular symbol of PSFCH (e.g., PSFCH symbol 730). The number of PSSCH resource pools (e.g., slots) associated with a particular symbol of PSFCH may be determined by a PSFCH symbol frequency (or a periodicity of PSFCH symbols). For example, for a configuration with a PSFCH symbol every two slots, each PSFCH symbol in a particular subchannel may be associated with two PSSCH resource pools (e.g., slots). Alternatively, for a configuration with a PSFCH symbol every four slots each PSFCH symbol in the particular subchannel may be associated with four PSSCH resource pools (e.g., slots).

The number of independent PSFCH resources in a PSFCH resource pool 711-717 may be increased by enabling the use of "Y" different cyclic shifts (e.g., 1, 2, 3, 4, or 6 different cyclic shifts) for transmitting HARQ feedback in each frequency resource (e.g., set of PRBs, PRB, or set of subcarriers) in the PSFCH resource pool. The different cyclic shifts may enable a device receiving the HARQ feedback to identify HARQ feedback transmitted from multiple other devices (e.g., devices receiving a groupcast transmission) using a same frequency resource.

Figure 8:
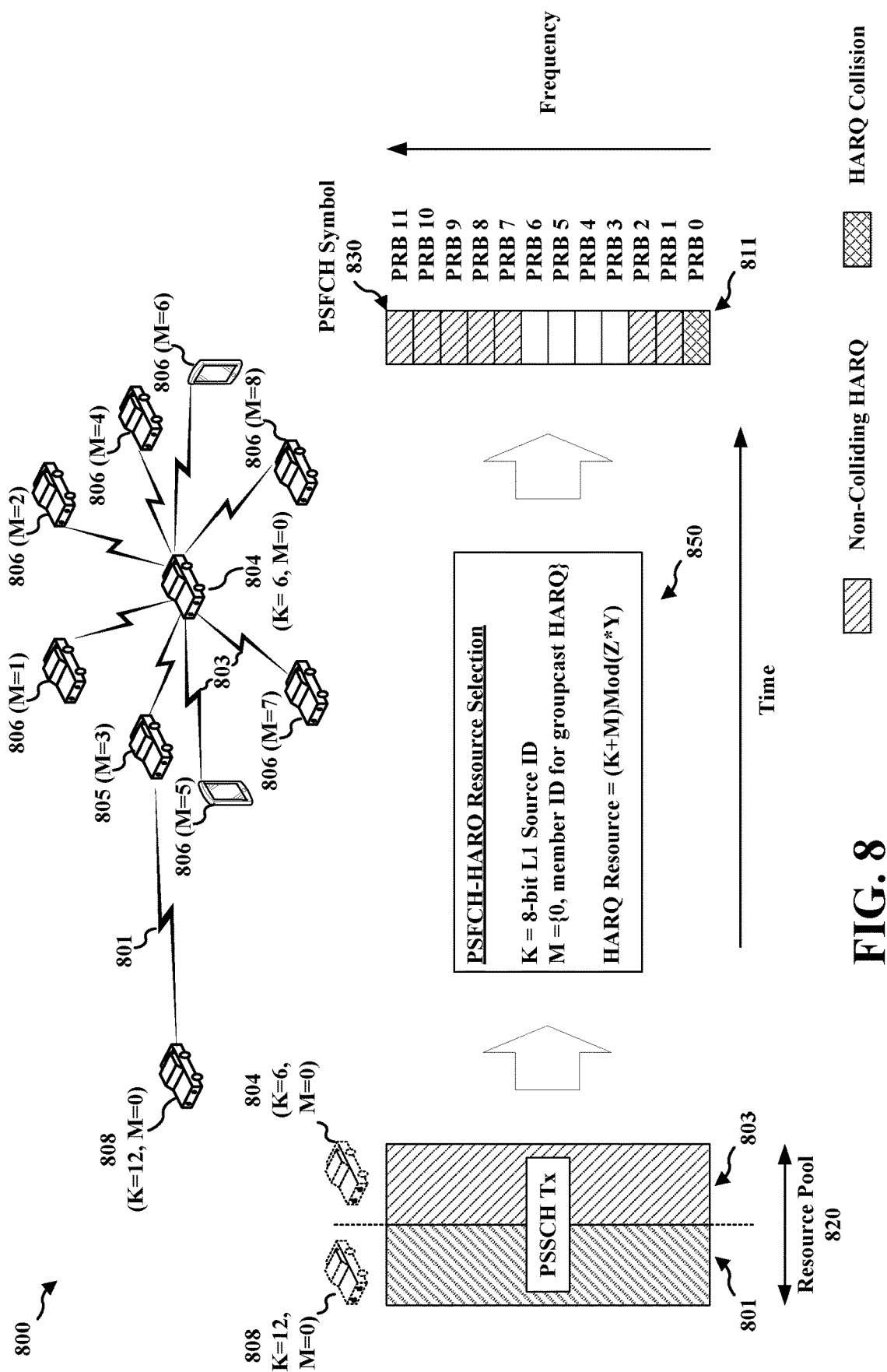
FIG. 8 is a diagram illustrating an example HARQ collision.

FIG. 8 is a diagram 800 illustrating an example HARQ collision. In some aspects, a device (e.g., device 805 and/or 806) receiving a PSSCH transmission (e.g., PSSCH transmission 801 and/or 803) may determine a resource (e.g., one of PRB 0 through PRB 11) for transmitting HARQ feedback in the set of PSFCH resources in a PSFCH symbol (e.g., PSFCH symbol 830). HARQ feedback may be associated with a SL communication to improve reliability of unicast and/or groupcast (e.g., multicast or broadcast). Each SL transmission may be associated with SCI which may include an 8-bit L1 source ID (e.g., the 8 least significant bits (LSB) of a 24-bit layer 2 (L2) ID) and a 16-bit L1 destination ID (e.g., the 16 LSB of the 24-bit L2 ID). The SCI may further include indications of one or more of a cast type, and a selected option for groupcast (e.g., option 1 or option 2 discussed below).

Each device (e.g., 805 and/or 806) receiving the transmitted SCI (e.g., within PSSCH 801 and/or 803) may blindly decode the transmitted SCI to determine whether (and how) to decode the associated SL transmission. Determining whether to decode the associated SL transmission may be based on a comparison of a set of 16-bit values (e.g., the 16 LSB of a set of L2 IDs) maintained by the receiving device and the 16-bit L1 destination ID included in the transmitted/received SCI. If the device receiving the transmitted SCI determines that the 16-bit L1 destination ID matches one of the set of 16-bit values maintained by the receiving device, the receiving device may further process the PSSCH and send a HARQ response via the PSFCH symbol 830. If the device receiving the transmitted SCI determines that the 16-bit L1 destination ID does not match one of the set of 16-bit values maintained by the receiving device, the receiving device may ignore (e.g., not decode) the associated PSSCH and send no HARQ response. While it may ignore the PSSCH, the receiving device may record related information for sensing in Mode 2 and channel busy radio (CBR) measurement for both modes (e.g., Mode 1 and Mode 2).

As described above in relation to FIG. 7, each PSSCH resource pool 820 may be mapped to a set of Z PRBs that may be selected for transmitting HARQ feedback. As illustrated the PSFCH symbol 830 includes 12 PSFCH resources (e.g., PRBs 0-11) with a single cyclic shift (Y=1). As discussed above, the number of selectable resources may be equal to the number of PRBs times the number of cyclic shifts (e.g., Z*Y). A particular resource (e.g., a particular PRB and cyclic shift) may be selected based on an 8-bit L1 source ID ("K"). As illustrated in the example PSFCH-HARQ resource selection algorithm 850, an index associated with a particular resource may further be selected based on a member ID ("M") associated with the selecting device (e.g., based on (K+M)Mod(Z*Y)). The member ID, M, may take different values when selecting a PSFCH-HARQ resource for providing feedback to a groupcast SL transmission and when selecting a PSFCH-HARQ resource for providing feedback to a unicast SL transmission. Additionally, when providing feedback for a groupcast, selecting a PSFCH-HARQ resource for providing NACK-only feedback ("option 1") may use a member ID value of 0 (e.g., M=0), while for providing ACK/NACK feedback ("option 2") each member of a groupcast may use a particular (e.g., a unique) member ID.

For example, device 805 (with M=3) may receive PSSCH transmission 801 and 803 from devices 808 and 804 respectively. If PSSCH transmission 801 is one of unicast or groupcast using NACK-only feedback (option 1), the device 805 may select a PSFCH-HARQ resource (e.g., PRB 0 811) based on the 8-bit L1 source ID of device 808 (e.g., K=12) and a membership ID of 0 (e.g., M=0). If PSSCH 803 is a groupcast using ACK/NACK feedback (option 2) the device 805 may select a PSFCH-HARQ resource (e.g., PRB 9) based on the 8-bit L1 source ID of device 804 (e.g., K=6) and a membership ID of 3 (e.g., M=3) associated with the particular groupcast.

As further illustrated, multiple devices may select a same PSFCH-HARQ resource (e.g., PRB 0 811) leading to a HARQ collision. For example, device 805 may select PRB 0 811 to transmit HARQ feedback related to PSSCH transmission 801 based on the 8-bit L1 source ID (K=12) and a unicast (or groupcast option 1) membership ID (M=0). Similarly, another device 806 may also select PRB 0 811 to transmit HARQ feedback related to PSSCH transmission 803 based on the 8-bit L1 source ID (K=6) and a groupcast option 2 membership ID (M=6).

Similarly, in some aspects, a base station (or a pair of devices) may, spatially reuse a resource, e.g., a base station may allocate a same PSSCH resource two different devices.

The spatial reuse by a base station (e.g., in Mode 1) may be based on a distance between devices and a transmission/reception signal power, such that the signals using the same PSSCH resource will not be received at a receiving device at relative powers that cause interference with each other (e.g., with a power difference less than a threshold power difference). In some aspects, two or more devices may reserve a same PSSCH resource based on a power (e.g., an RSRP) of a signal from the other device(s) being below a threshold for identifying resources reserved by other devices.

When resource reuse is employed, HARQ collisions may be caused by the resource reuse as described above. For SL transmissions that are transmitted at less than max power, the spatial reuse may be based on a reduced coverage area of the SL transmission. A first receiving device in a coverage area of a first transmitting device may receive an SL transmission via the reused PSSCH resource and may transmit HARQ feedback via a first PSFCH-HARQ resource selected in an associated PSFCH symbol. A second receiving device in a coverage area of a second transmitting device may receive an SL transmission via the reused PSSCH resource and may transmit HARQ feedback via a second PSFCH-HARQ resource selected in the associated PSFCH symbol. If the 8-bit L1 source IDs of the first and second transmitting devices are the same (or if $(K+M)Mod(Z*Y)$ is the same for the receiving devices) the first and second receiving devices may select the same PSFCH-HARQ resource. The probability of a HARQ collision for a combination of unicast and/or NACK-only (option 1) groupcast transmissions may be approximately $$\frac{1}{Min(256, Z*Y)},$$

where 256 is the number of unique 8-bit L1 source IDs. If one of the unicast and/or NACK-only (option 1) groupcast transmissions is replaced with an ACK/NACK (option 2) groupcast transmission, the probability of a HARQ collision may increase by a factor X, where X is a number of devices responding to the SL ACK/NACK (option 2) groupcast transmission. For a combination of ACK/NACK (option 2) groupcast transmissions the probability may increase by a factor of $X*X'$, where X and X' are the number of devices responding to first and second SL ACK/NACK (option 2) groupcast transmissions, respectively. In some aspects, there may be no SL path-loss aware power control for PSFCH and the HARQ feedback may be transmitted with a max transmission power that has a larger coverage area than the original transmission. Accordingly, the pollution (e.g., interference) may be greater over PSFCH than it is for PSSCH. For example, a signal-to-interference-and-noise ratio (SINR) that may be above a threshold for tight PSSCH spatial reuse may be associated with a SINR that is below a threshold for a similarly tight PSFCH spatial reuse. Accordingly, it may be beneficial to avoid or suppress PSFCH collisions.

Figure 9:
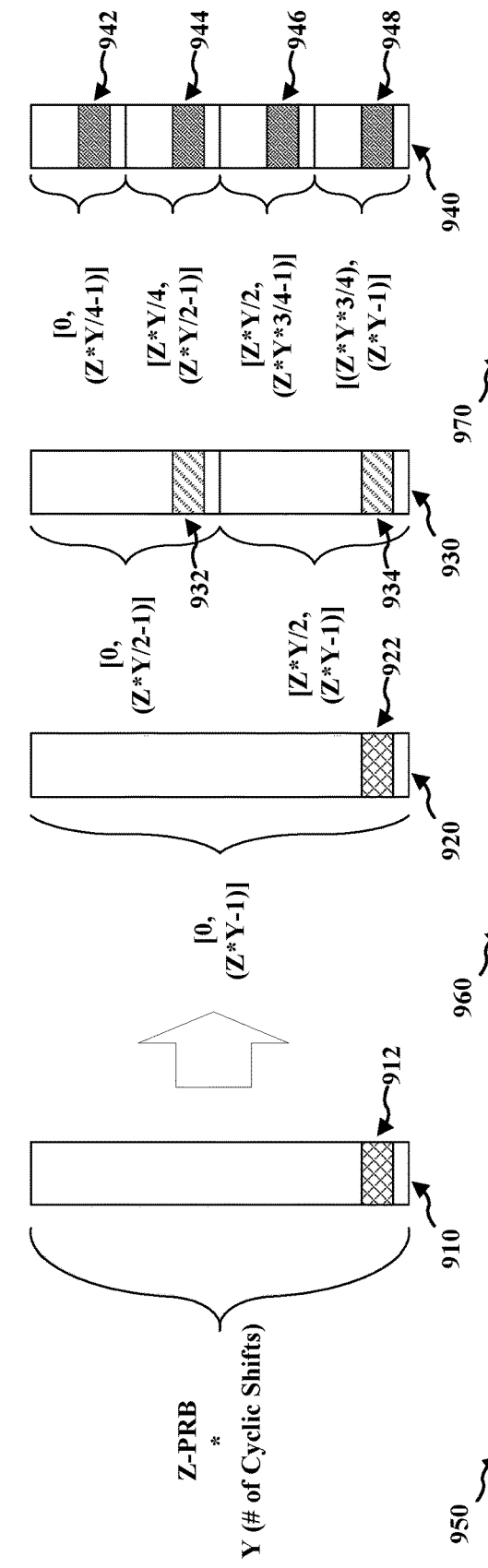
FIG. 9 is a diagram of a set of nested PSFCH resource sub-pools for a particular PSFCH sub-pool.

FIG. 9 is a diagram 900 of a set of nested PSFCH resource sub-pools for a particular PSFCH sub-pool 910. The nested sub-pool structure includes PSFCH resource sub-pool defined at different levels of PSFCH resource pool partitioning. For example, a first-level partitioning ("$0^{th}$ level" partitioning 920) defining a PSFCH resource sub-pool that includes all the resources in the PSFCH resource pool 910. A second-level partitioning ("$1^{st}$ level" partitioning 930) defining a set of non-overlapping PSFCH resource sub-pools that each include an equal fraction (e.g., half) of the PSFCH resources in the PSFCH resource pool. A third-level partitioning ("$2^{nd}$ level" partitioning 940) defining a set of non-overlapping PSFCH resource sub-pools that each include an equal portion (e.g., one quarter) of the PSFCH resources in the PSFCH resource pool sub-910 (or one half of the PSFCH resource sub-pools at the second level). The particular partition and level of partitioning may be identified by a PSFCH sub-pool resource indication (PSRI) included in SCI. For example, for the three levels of partitioning illustrated in diagram 900, a three-bit PSRI may identify a range (e.g., a partition) of PSFCH-HARQ resources as illustrated in layer 3 (L3) (pre-) configuration 960. As there is one unused combination (e.g., 111) of the three bits in the set of PSRIs in L3 (pre-)configuration 960, it may be used to indicate an additional partition including, e.g., three of the four partitions at the second level partitioning 940. Additional levels (or more divisions per partition level) may be defined but may increase the signaling overhead (e.g., each additional level dividing a partition at a previous level into two equal partitions may increase the signaling overhead by one bit).

As discussed above, PSFCH-HARQ resource selection algorithm 950 illustrates an equation for identifying an index associated with a particular resource that may be selected based on the 8-bit L1 source ID, K, and the member ID, M, associated with the selecting device (e.g., based on $(K+M)$ $Mod(Z*Y)$). A device may receive a configuration 960 of the nested PSFCH resource pools and a set of identifiers/indexes for each partition defined in the nested sub-pools. The configuration may be a pre-configuration, e.g., for Mode 1 or Mode 2 SL resource reservation. The configuration may also be a configuration received from a base station, e.g., via RRC or system information blocks (SIBs) (e.g., for a Mode 1 SL resource selection). Based on the received configuration 960 of the nested PSFCH resource pools and a PSRI associated with a PSSCH transmission, a device that receives a PSSCH transmission may select a PSFCH-HARQ resource for transmitting HARQ feedback.

The nested sub-pool structure (e.g., the configuration 960 of the nested PSFCH resource pools) may provide a base station or device with finer-granularity management of PSFCH resources. The PSRI associated with a PSSCH may be updated dynamically via DCI (e.g., in Mode 1 SL resource allocation) and SCI. In some aspects, PSFCH resources may be implicitly assigned/allocated relying on the 8-bit L1 source ID (in turn based on an L2 SL ID assigned by a device's upper layer) without input from a base station (or network) that could help to avoid HARQ-collisions by, e.g., allocating resources for devices having a same 8-bit L1 source ID to different sub-pools.

For example, a PSRI may be determined by a base station or device based on a number of expected PSFCH-HARQ feedback messages. For example, for a unicast or NACK-only (option 1) groupcast, one PSFCH-HARQ feedback message may be expected, while for an ACK/NACK (option 2) groupcast, a number of PSFCH-HARQ feedback messages that may be equal to the number of members of associated with the groupcast. Accordingly, a highest-level partition (e.g., a smallest partition) may be indicated for a unicast or NACK-only groupcast SL transmission, while a lower-level partition (e.g., a larger partition) with a number of resources greater than the number of members of a groupcast may be indicated.

Based on the PSRI, a receiving device may determine a PSFCH resource within the partition indicated by the PSRI for transmitting HARQ feedback. For example, PSFCH-HARQ resource selection algorithm 970 may be used to select a resource, e.g., based on $(K+M)Mod((Z*Y)/2^l)$, where l is a value associated with the level of partitioning for the partitioning structure in diagram 900. For a particular value of K+M, resource 912, 922, 932, 934, 942, 944, 946, and 948 may be selected based on the PSRI transmitted by the transmitting device.

Figure 10:
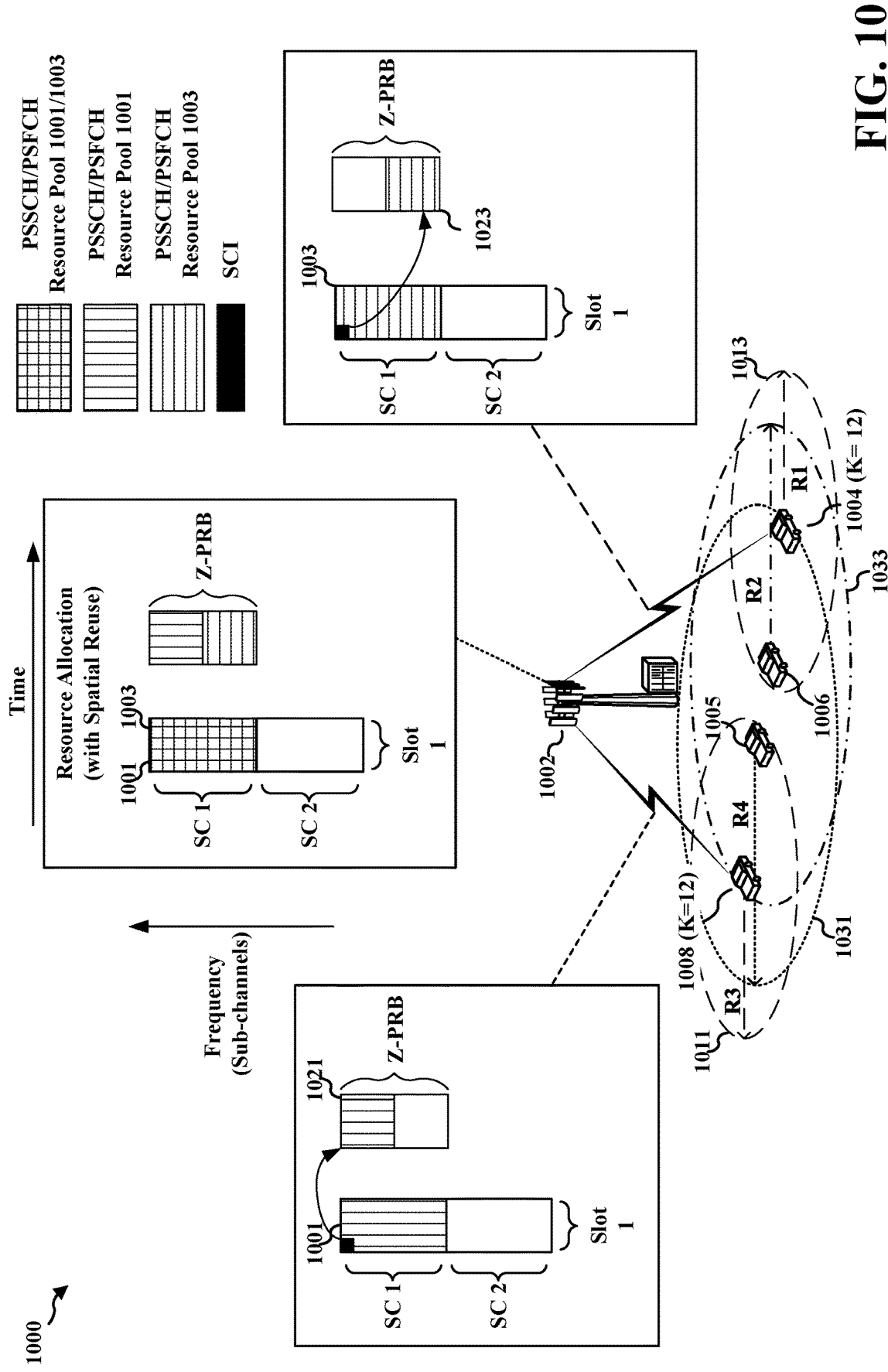
FIG. 10 is a diagram illustrating another benefit of PSFCH resource pool partitioning for PSSCH spatial reuse when operating in Mode 1.

FIG. 10 is a diagram 1000 illustrating another benefit of PSFCH resource pool partitioning for PSSCH spatial reuse when operating in Mode 1. Diagram 1000 indicates a base station 1002 in communication with devices 1004 and 1008 each requesting resources for a SL transmission. Device 1004 may indicate, or base station 1002 may identify, a coverage area 1013 of the SL transmission (e.g., a circular area around device 1004 with radius "R1"). Device 1008 may indicate, or base station 1002 may identify, a coverage area 1011 of the SL transmission (e.g., a circular area around device 1008 with radius "R3"). Based on a determination that the coverage areas 1011 and 1013 are spatially separate, the base station 1002 may allocate a same PSSCH resource, e.g., sub-channel 1 (SC 1) and slot 1, for SL transmissions 1001 and 1003.

Additionally, base station 1002 may allocate different partitions of a PSFCH symbol for transmitting HARQ feedback. The different partitions may be indicated via a PSRI included in DCI or in a combination of PDCCH and DCI (e.g., via the index of the first CCE for PDCCH reception and the partial PSRI in a DCI payload). For example, base station 1002 may allocate partition 1021 for transmitting HARQ feedback associated with SL transmission 1001 from device 1008, and may allocate partition 1023 for transmitting HARQ feedback associated with SL transmission 1003 from device 1004. Devices 1004 and 1008 may transmit a PSRI indicating for receiving devices to transmit feedback via PSFCH partition 1023 and 1021, respectively.

As illustrated, devices 1004 and 1008 share a same 8-bit L1 source ID (K=12). Additionally, diagram 1000 illustrates a coverage area 1033 (e.g., with radius "R2") of a PSFCH HARQ feedback transmission from receiving device 1006 (associated with SL transmission 1003 from device 1004) and a coverage area 1031 (e.g., with radius "R4") of a PSFCH HARQ feedback transmission from receiving device 1005 (associated with SL transmission 1001 from device 1008). While each transmitting device (e.g., 1004 and 1008) is in range of the HARQ feedback transmitted from both receiving devices (e.g., 1005 and 1006) and share a same 8-bit L1 source identifier, the feedback will be received via different resources based on the indication of the different partitions (e.g., via the PSRI).

Figure 11:
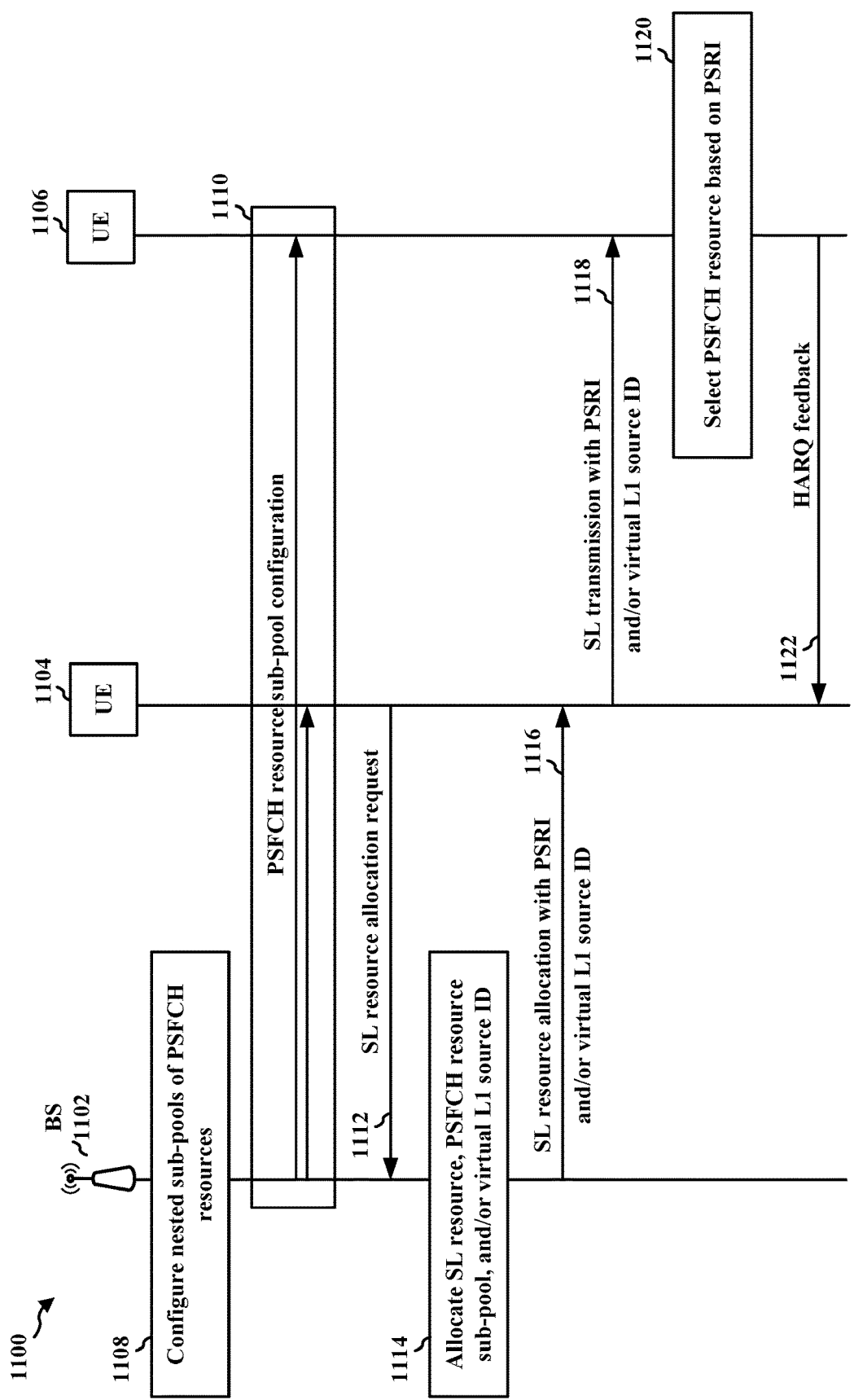
FIG. 11 is a call flow diagram illustrating a method of wireless communication employing a PSRI.

FIG. 11 is a call flow diagram 1100 illustrating a method of wireless communication employing a PSRI. Diagram 1100 illustrates that a base station 1102 may configure 1108 nested sub-pools of PSFCH resources for a PSFCH resource pool (e.g., a PSFCH resource nested sub-pool configuration). The PSFCH resource pool may be for transmitting HARQ feedback associated with PSSCH transmissions via a particular sub-channel. The nested sub-pools may include PSFCH resource sub-pools defined at different levels of PSFCH resource pool partitioning. For example, a first-level partitioning defining a PSFCH resource sub-pool that includes all the resources in the PSFCH resource pool. A second-level partitioning may define a set of non-overlapping PSFCH resource sub-pools that each include an equal fraction (e.g., half) of the PSFCH resources in the PSFCH resource pool. A third-level partitioning defining a set of non-overlapping PSFCH resource sub-pools that each include an equal portion (e.g., one quarter) of the PSFCH resources in the PSFCH resource pool (or one half of the PSFCH resource pools at the second level). Additional levels may be defined but may increase the signaling overhead (e.g., each additional level dividing a partition at a previous level into two equal partitions may increase the signaling overhead by one bit). The base station 1102 may transmit the configuration of the nested sub-pools of PSFCH resources (e.g., PSFCH resource sub-pool configuration 1110) to a set of devices including UEs 1104 and 1106. The configuration 1110 may be transmitted via L3 signaling (e.g., via RRC signaling or via a SIB/MIB).

The UE 1104 may transmit a resource allocation request 1112 (e.g., a configured grant or dynamic grant) for a particular SL transmission. The request may include a request for a resource allocation for (1) the particular SL transmission and (2) a corresponding HARQ feedback. The request may further include a requested PSFCH resource sub-pool partitioning level. The requested PSFCH resource sub-pool partitioning level may be one of the first partitioning level, the second partitioning level, or the third partitioning level for the example three-level partitioning described above.

The requested level of partitioning may be based on a traffic characteristic of the particular SL transmission, e.g., a number of UEs associated with the particular SL transmission (e.g., a size of a group associated with a groupcast (option 2) SL transmission) or a traffic type (e.g., unicast, groupcast (option 1), groupcast (option 2), or broadcast). Additionally, or alternatively, the request may include the traffic characteristic of the particular SL transmission related to a traffic characteristic criteria on which the base station may base an allocation of the particular PSFCH resource sub-pool. For example, the UE 1104 or the base station 1102 may base a requested (or allocated) PSFCH resource sub-pool on a traffic characteristic criteria relating to the number of expected HARQ feedback transmission resources associated with the particular SL transmission. For a unicast transmission, or groupcast NACK-only (option 1) transmission, one PSFCH resource may be expected, while for a groupcast ACK/NACK (option 2) transmission the number of expected HARQ feedback transmission resources may be equal to the size of the groupcast group. Accordingly, for unicast or NACK-only groupcast, a partition at the highest level (e.g., the level with the least amount of resources per partition) may be allocated or requested, while for an ACK/NACK groupcast, a partition at a lower (or lowest) level (e.g., a level with an intermediate or largest amount of resources per partition) may be allocated or requested based on the size of the group.

The base station 1102 may receive the SL resource allocation request 1112 and allocate 1114 a PSSCH resource (e.g., sub-channel(s) and slot(s)) for the SL transmission. The base station may further allocate a PSFCH resource sub-pool and/or a virtual 8-bit L1 source ID. The base station may allocate a PSFCH resource sub-pool based on multiple requests for SL resources from multiple devices. For example, if a large number of requests are made for SL transmissions within a same time interval (e.g., a set of slots), the base station 1102 may perform spatial reuse of PSSCH resources such that at least one set of two (or more) devices that are separated by a threshold distance or by intervening objects blocking SL transmissions may be allocated a same PSSCH resource (as described above in relation to FIG. 10). In order to avoid a HARQ feedback collision, the base station 1102 may determine whether the 8-bit L1 source IDs of the two devices are the same. If the 8-bit L1 source IDs are the same, the base station may allocate different PSFCH resource sub-pools to each of the two devices. Alternatively, or additionally, the base station 1102 may generate a virtual 8-bit L1 source ID for one or both of the devices to avoid a HARQ collision.

The allocation of either (1) different PSFCH resource sub-pools or (2) at least one virtual 8-bit L1 source ID may be based on the traffic type of the SL transmissions for which resources are requested. For example, if SL transmissions from both devices are associated with an ACK/NACK groupcast, the base station may allocate different PSFCH resource sub-pools to allow for each group to use all the available PSFCH resources in the different PSFCH resource sub-pools without HARQ feedback collisions. If SL transmissions from both devices are associated with an unicast or NACK-only groupcast, the base station may allocate a same PSFCH resource sub-pool and generate a virtual 8-bit L1 source ID for at least one device that is different from the 8-bit L1 source ID (virtual or unmodified) of the other device to avoid HARQ feedback collisions while allowing other PSFCH resource sub-pools to be used for other ACK/NACK groupcast transmissions or to be repurposed for other (non-HARQ feedback) types of transmissions (e.g., low-bit control information).

In some aspects, e.g., when a first device is requesting SL resources for a unicast transmission and a second device is requesting SL resources for transmission of an ACK/NACK groupcast, the base station 1102 may allocate the same PSFCH resource sub-pool to both devices and assign a virtual 8-bit L1 source ID to one of the devices to minimize the likelihood of a HARQ feedback collision. For example, the first (or second) device may be assigned a virtual 8-bit L1 source ID that is one below (or above) the 8-bit L1 source ID of the second (or first) device. By assigning such a virtual 8-bit L1 source ID the resources selected by the group members associated with the groupcast transmission can lead to a HARQ feedback collision if the number of devices associated with the groupcast (e.g., groupcast members) is at least as large as the number of resources in the (shared) PSFCH resource sub-pool. A similar use of virtual 8-bit L1 source IDs may be employed for devices with known group sizes associated with an ACK/NACK groupcast, such that a virtual 8-bit L1 source ID may be assigned to one or both devices such that the virtual IDs are separated by at least as many members of the group associated with the device assigned the lower virtual ID.

The base station 1102 may transmit, and requesting devices (including UE 1104) may receive, SL resource allocation with a PSRI and/or virtual L1 source ID 1116. The SL resource allocation, the PSRI indicating the PSFCH resource sub-pool, and/or the virtual 8-bit L1 source ID may be transmitted through a L1 message (e.g., via DCI such as DCI 3-0). In some aspects, the PSRI may be indicated by a combination of a first CCE for PDCCH reception and a partial PSRI in a DCI (e.g., DCI 3-0) payload. The SL resource allocation with a PSRI and/or virtual L1 source ID 1116 may further include a PSRI associated with a PSFCH resource sub-pool that has been repurposed for other (non-HARQ feedback) types of transmissions (e.g., low-bit control information).

Based on the allocated resources, the UE 1104 may transmit, and the UE 1106 may receive, the SL transmission with the PSRI and/or the virtual L1 source ID 1118. The PSRI may be transmitted via a L1 message (e.g., SCI such as SCI-1 or SCI-2). The UE 1104 (e.g., via the L1 message/SCI) may reserve N resources for transmissions and/or retransmissions of an SL transmission (e.g., a TB). For each transmission, the UE 1104 may reserve future time and frequency resources for an initial transmission and up to two retransmissions. The UE 1104 may transmit, for each of the reserved future time and frequency resources, a PSRI indicating an associated PSFCH resource sub-pool.

Based on the SL transmission 1118, the UE 1106 may identify that the SL transmission is directed to itself, as discussed above in relation to FIG. 8, and select 1120 a PSFCH resource in the PSFCH resource sub-pool indicated in the PSRI based on a received 8-bit L1 source ID (virtual or unmodified) and a group member value as discussed in relation to FIG. 9 (e.g., PSFCH-HARQ resource selection algorithm 970). The UE 1106 may transmit HARQ feedback 1122 (e.g., ACK or NACK for unicast or ACK/NACK (option 2) groupcast, and NACK for NACK-only (option 1) groupcast to UE 1104 via the selected 1120 PSFCH resource. The UE 1104 may monitor the PSFCH resource sub-pool indicated by the PSRI for the HARQ feedback associated with the SL transmission 1118 and may receive HARQ feedback 1122 via the selected 1120 PSFCH resource. While FIG. 11 illustrates PSRI selected by a base station, in some aspects, PSRI may be selected autonomously by a UE (e.g., in a mode 2 SL resource selection operation/procedure).

Figure 12:
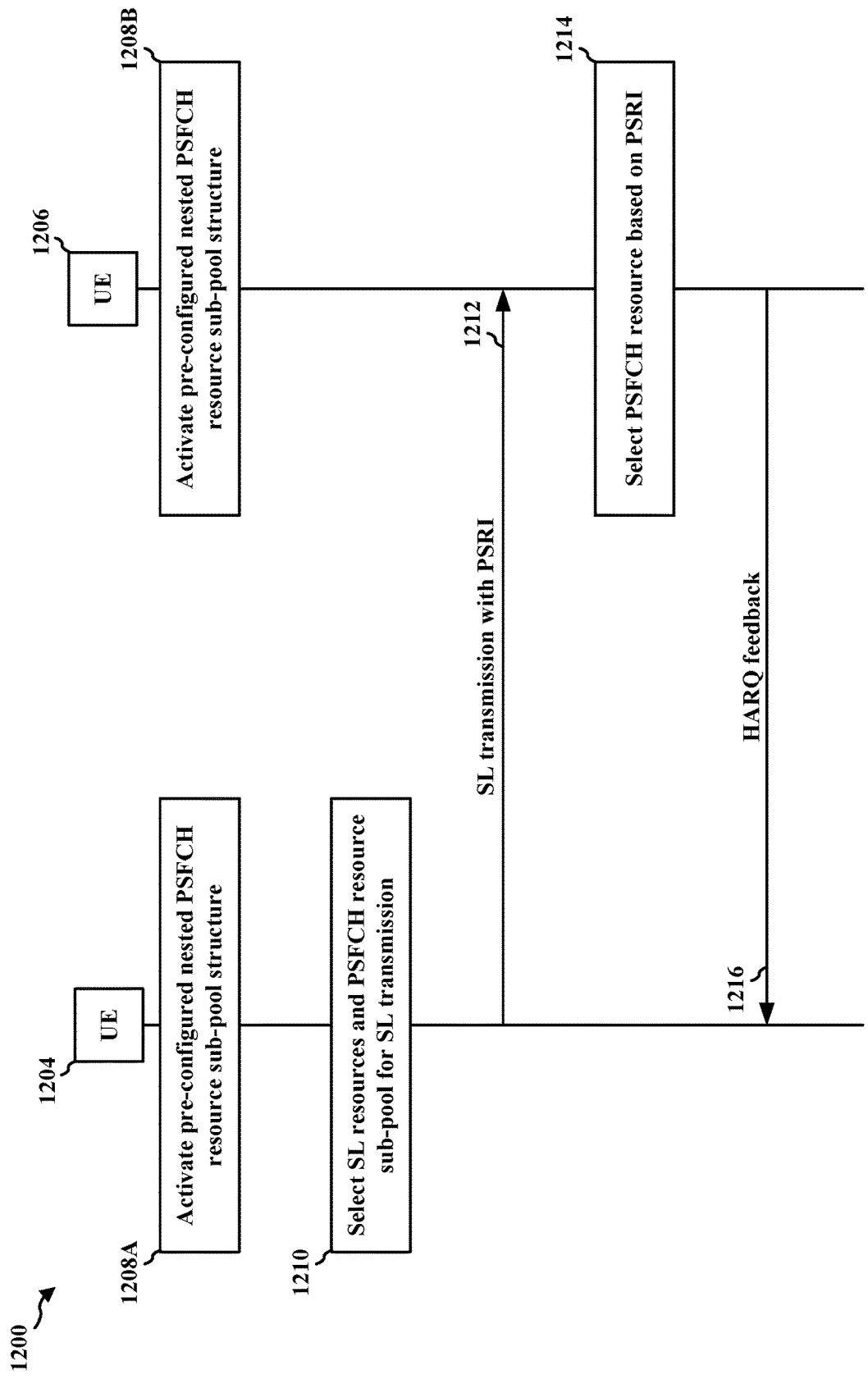
FIG. 12 is a call flow diagram illustrating a method of wireless communication employing a PSRI.

FIG. 12 is a call flow diagram 1200 illustrating a method of wireless communication employing a PSRI. Diagram 1200 illustrates that a pair of devices (e.g., UEs 1204 and 1206) may use an activated 1208A and 1208B pre-configured nested PSFCH resource sub-pool structure. The PSFCH resource pool may be for transmitting HARQ feedback associated with PSSCH transmissions via a particular sub-channel. The nested sub-pools may include PSFCH resource sub-pools defined at different levels of PSFCH resource pool partitioning. For example, a first-level partitioning defining a PSFCH resource sub-pool that includes all the resources in the PSFCH resource pool. A second-level partitioning may define a set of non-overlapping PSFCH resource sub-pools that each include an equal fraction (e.g., half) of the PSFCH resources in the PSFCH resource pool. A third-level partitioning defining a set of non-overlapping PSFCH resource sub-pools that each include an equal portion (e.g., one quarter) of the PSFCH resources in the PSFCH resource pool (or one half of the PSFCH resource pools at the second level). Additional levels may be defined but may increase the signaling overhead (e.g., each additional level dividing a partition at a previous level into two equal partitions may increase the signaling overhead by one bit).

For a particular SL transmission from the UE 1204 to the UE 1206 may select 1210 SL resources (e.g., PSSCH resources) for a SL transmission and a PSFCH resource sub-pool for receiving HARQ feedback related to the SL transmission. The selection may be based on a mode 2 resource selection procedure as described in relation to FIG. 6. Additionally, the UE 1204 may select a PSFCH resource sub-pool that is different from a PSRI transmitted by another device during a sensing window. For example, selecting 1210 the PSFCH resource sub-pool may include at least one of (1) receiving at least one PSRI from at least one UE via a SL transmission during a sensing window of a reservation operation associated with the particular SL transmission, or (2) determining a number of UEs associated with the particular SL transmission for which a PSFCH resource sub-pool is used for transmitting HARQ feedback. The particular PSFCH resource sub-pool may be selected based on at least one of the received at least one PSRI or the determined number of UEs associated with the particular SL transmission.

Based on the selected 1210 resources, the UE 1204 may transmit, and the UE 1206 may receive, the SL transmission 1212 with the PSRI. The PSRI may be transmitted via a L1 message (e.g., SCI such as SCI-1 or SCI-2). The UE (e.g., via the L1 message/SCI) may reserve N resources for transmissions and/or retransmissions of an SL transmission (e.g., a TB). For each transmission, the UE may reserve future time and frequency resources for an initial transmission and up to two retransmissions. The UE may transmit, for each of the reserved future time and frequency resources, a PSRI indicating an associated PSFCH resource sub-pool.

Based on the SL transmission 1212, the UE 1206 may identify that the SL transmission is directed to itself, as discussed above in relation to FIG. 8, and select 1214 a PSFCH resource in the PSFCH resource sub-pool indicated in the PSRI based on a received 8-bit L1 source ID and a group member value as discussed in relation to FIG. 9 (e.g., PSFCH-HARQ resource selection algorithm 970). The UE 1206 may transmit HARQ feedback 1216 (e.g., ACK or NACK for unicast or ACK/NACK (option 2) groupcast, and NACK for NACK-only (option 1) groupcast to UE 1204 via the selected 1214 PSFCH resource. The UE 1204 may monitor the PSFCH resource sub-pool indicated by the PSRI for the HARQ feedback associated with the SL transmission 1212 and may receive HARQ feedback 1216 via the selected 1214 PSFCH resource.

Figure 13:
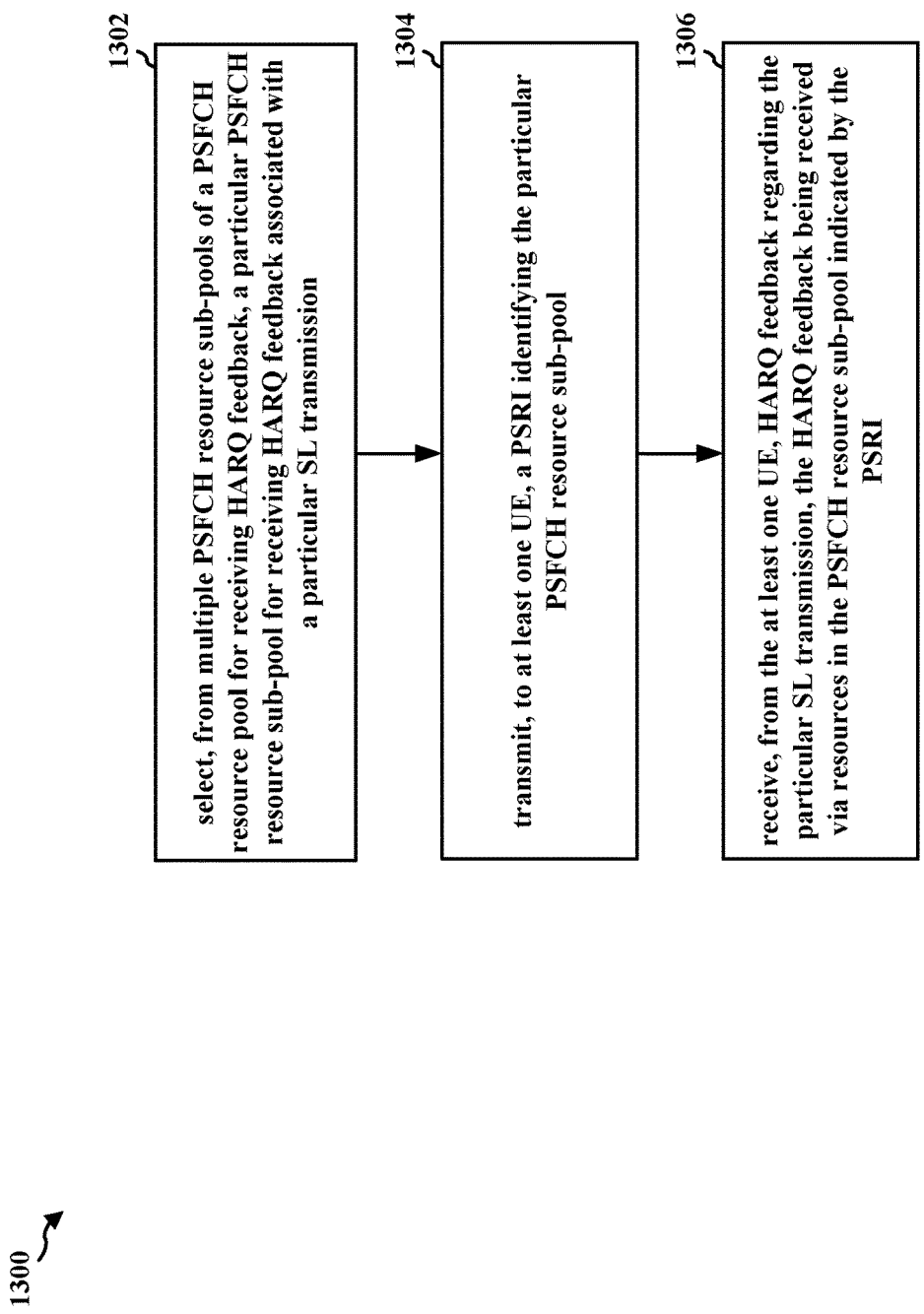
FIG. 13 is a flowchart of a method of wireless communication.

FIG. 13 is a flowchart 1300 of a method of wireless communication. The method may be performed by a sidelink-capable device (e.g., the UE 104, 402, 404, 406, 804, 1004, 1008, 1104, and/or 1204; the apparatus 2202). At 1302, the device may select, from multiple PSFCH resource sub-pools of a PSFCH resource pool for receiving HARQ feedback, a particular PSFCH resource sub-pool for receiving HARQ feedback associated with a particular SL transmission. The multiple PSFCH resource sub-pools of a PSFCH resource pool for receiving HARQ feedback may be configured as described above in relation to FIG. 9 and configured via L3 messages (e.g., RRC and/or SIB signaling) as described in relation to FIG. 11 or pre-configured as described in relation to FIG. 12.

Selecting, at 1302, the particular PSFCH resource sub-pool may include transmitting a request for a resource allocation to a base station and receiving resource allocation information (e.g., a PSRI) indicating the particular PSFCH resource sub-pool from the base station (e.g., via a L1 signal such as DCI). Where the device selects, at 1302, the indicated particular PSFCH resource sub-pool. The base station may also transmit (and the device may receive) a virtual 8-bit L1 source ID as described in relation to FIG. 11 to use in conjunction with the SL communication. The request may include a request for a resource allocation for (1) the particular SL transmission and (2) a corresponding HARQ feedback. The request may further include a requested PSFCH resource sub-pool partitioning level. The requested PSFCH resource sub-pool partitioning level may be one of the first partitioning level, the second partitioning level, or the third partitioning level for the example three-level partitioning described above.

The requested level of partitioning may be based on a traffic characteristic of the particular SL transmission, e.g., a number of UEs associated with the particular SL transmission (e.g., a size of a group associated with a groupcast (option 2) SL transmission) or a traffic type (e.g., unicast, groupcast (option 1), groupcast (option 2), or broadcast).

Additionally, or alternatively, the request may include the traffic characteristic of the particular SL transmission related to a traffic characteristic criteria on which the base station may base an allocation of the particular PSFCH resource sub-pool. For example, the device may base a requested PSFCH resource sub-pool on a traffic characteristic criteria relating to the number of expected HARQ feedback transmission resources associated with the particular SL transmission. For a unicast, or groupcast NACK-only (option 1), transmission one PSFCH resource may be expected, while for a groupcast ACK/NACK (option 2) transmission the number of expected HARQ feedback transmission resources may be equal to the size of the groupcast group. Accordingly, for unicast or NACK-only groupcast, a partition at the highest level (e.g., the level with the least amount of resources per partition) may be requested, while for an ACK/NACK groupcast, a partition at a lower (or lowest) level (e.g., a level with an intermediate or largest amount of resources per partition) may be requested based on the size of the group.

In some aspects, selecting the particular PSFCH resource sub-pool at 1302 includes autonomously selecting the particular PSFCH resource sub-pool (e.g., via a mode 2 resource selection procedure) for SL communication with at least one other device. The autonomous selection may include at least one of (1) receiving at least one PSRI from at least one UE via a SL communication during a sensing window of a reservation operation associated with the particular SL transmission, or (2) determining a number of UEs associated with the particular SL transmission for which a PSFCH resource sub-pool is used for transmitting HARQ feedback. The particular PSFCH resource sub-pool may be selected based on at least one of the received at least one PSRI or the determined number of UEs associated with the particular SL transmission. The PSFCH resource sub-pool selected at 1302 may be a PSFCH resource sub-pool that does not overlap with a PSFCH resource sub-pool indicated by the at least one received PSRI. The particular PSFCH resource sub-pool may be selected, at 1302, from one of the first partitioning level, the second partitioning level, or the third partitioning level based on the determined number of UEs associated with the particular SL transmission for which a PSFCH resource sub-pool is used for transmitting HARQ feedback.

In some aspects, autonomously selecting the PSFCH resource sub-pool at 1302 may include determining a first set of reserved sub-channels in a selection window with reserved resources for SL communication that are associated with a PSRI indicating a PSFCH resource sub-pool defined at or below a first threshold level of partitioning; selecting a sub-channel for transmitting the particular SL transmission from a set of unreserved sub-channels in the selection window that does not include the first set of reserved sub-channels; and selecting, from a plurality of PSFCH resource sub-pools of a PSFCH resource pool associated with the selected sub-channel, the particular PSFCH resource sub-pool for receiving HARQ feedback. In some aspects, the first set of reserved sub-channels is associated with at least one of (1) an RSRP that is above a second threshold RSRP that is less than the first threshold RSRP or (2) an RSRP that is measurable by the device and selecting the particular PSFCH resource sub-pool, at 1302, may also include determining a second set of reserved sub-channels in a selection window with reserved resources for SL communication that are (1) associated with a PSRI indicating a PSFCH resource sub-pool defined at a level of partitioning that is at or below a second threshold level of partitioning and above the first threshold level of partitioning, and (2) associated with a RSRP that is above a first threshold RSRP, where the set of unreserved sub-channels does not include the second set of reserved sub-channels. For example, referring to FIGS. 11 and 12, UE 1104 or 1204 may select 1210 a PSFCH resource sub-pool (or receive a resource allocation 1116 and select the indicated resources) for SL transmissions 1118 or 1212. For example, 1302 may be performed by PSFCH resource selection component 2242.

At 1304, the device may transmit, to at least one UE, a PSRI identifying the particular PSFCH resource sub-pool. The PSRI may be transmitted via a L1 message (e.g., SCI such as SCI-1 or SCI-2). The device (e.g., via the L1 message/SCI) may reserve N resources for transmissions and/or retransmissions of an SL transmission (e.g., a TB). For each transmission, the UE may reserve future time and frequency resources for an initial transmission and up to two retransmissions. The UE may transmit, for each of the reserved future time and frequency resources, a PSRI indicating an associated PSFCH resource sub-pool. For example, referring to FIGS. 9, 11, and 12, a UE 1104 or 1204 may transmit an SL transmission 1118 or 1212 with a PSRI (e.g., a three-digit indicator as described in relation to FIG. 9) to at least one UE (including UE 1106 or 1206). For example, 1304 may be performed by PSFCH resource selection component 2242.

Finally, at 1306, the device may receive, from the at least one UE, HARQ feedback regarding the particular SL transmission, the HARQ feedback being received via at least one PSFCH resource in the PSFCH resource sub-pool indicated by the PSRI. A PSFCH resource in the PSFCH resource sub-pool indicated by the PSRI may be selected by a receiving device based on an 8-bit L1 source identifier (K) associated with the transmitting device and a member ID (M) associated with the receiving device. The membership ID (M) may take a value M=0 for unicast or NACK-only (option 1) groupcast or may take a value M=[0, X−1] where X is the number of devices associated with an ACK/NACK (option 2) groupcast. For example, referring to FIGS. 9, 11, and 12, a UE 1104 or 1204 may receive HARQ feedback 1122 or 1216 from UE 1106 or 1206 based on the PSRI (e.g., a three-digit indicator as described in relation to FIG. 9), the 8-bit L1 source ID (K), and a membership ID (M) from at least one UE (including UE 1106 or 1206). For example, 1306 may be performed by HARQ feedback reception/transmission component 2244.

Figure 14:
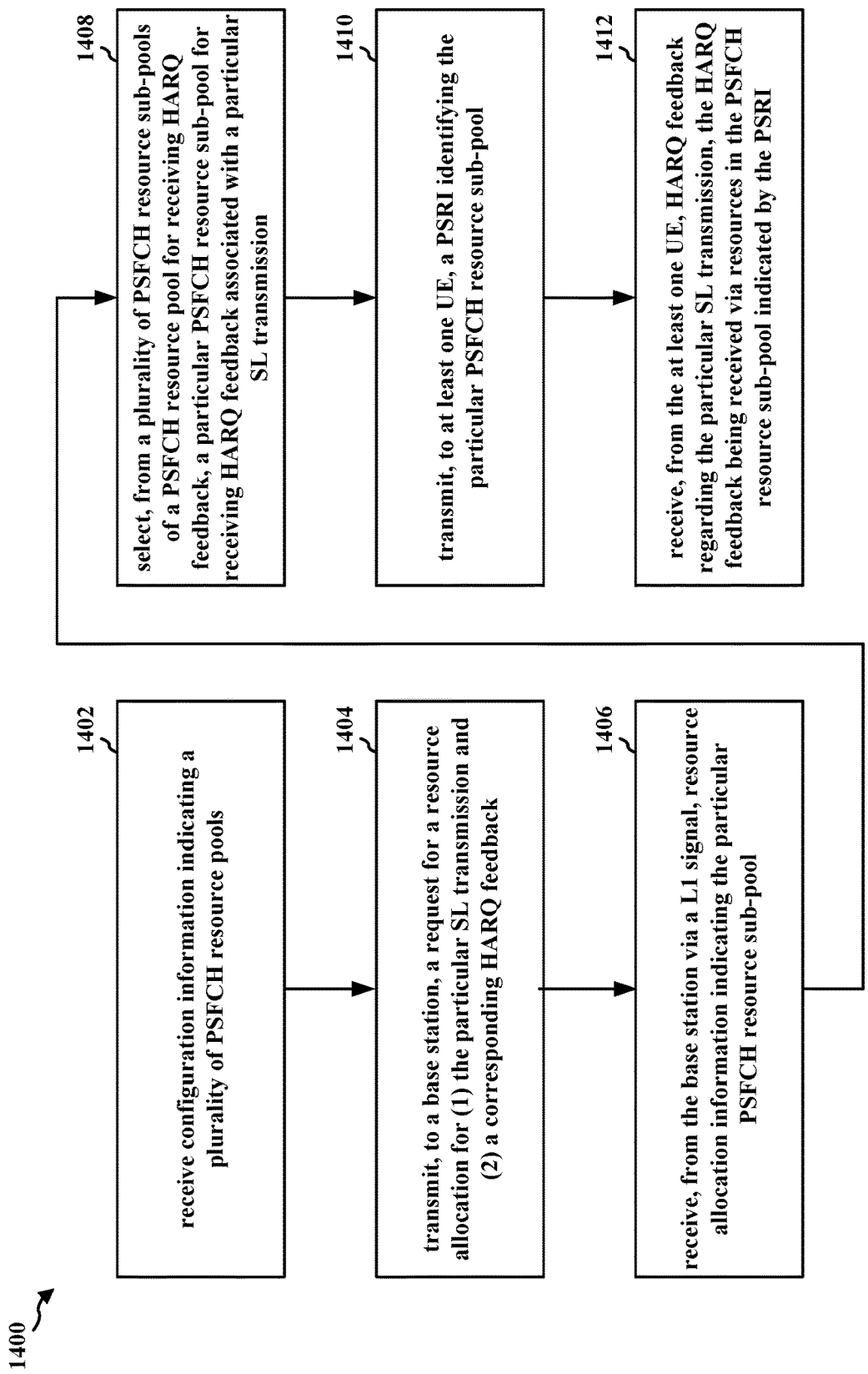
FIG. 14 is a flowchart of a method of wireless communication.

FIG. 14 is a flowchart 1400 of a method of wireless communication. The method may be performed by a sidelink-capable device (e.g., the UE 104, 402, 404, 406, 804, 1004, 1008, 1104, and/or 1204; the apparatus 2202). At 1402, the device may receive configuration information indicating a plurality of PSFCH resource sub-pools. The configuration information may be received via RRC signaling or via a SIB. The plurality of PSFCH resource sub-pools may be a plurality of nested PSFCH resource sub-pools for transmitting HARQ feedback associated with PSSCH transmissions via a particular sub-channel. The nested sub-pools may include PSFCH resource sub-pools defined at different levels of PSFCH resource pool partitioning. For example, a first-level partitioning defining a PSFCH resource sub-pool that includes all the resources in the PSFCH resource pool. A second-level partitioning may define a set of non-overlapping PSFCH resource sub-pools that each include an equal fraction (e.g., half) of the PSFCH resources in the PSFCH resource pool. A third-level partitioning defining a set of non-overlapping PSFCH resource sub-pools that each include an equal portion (e.g., one quarter) of the PSFCH resources in the PSFCH resource pool (or one half of the PSFCH resource pools at the second level). Additional levels may be defined but may increase the signaling overhead (e.g., each additional level dividing a partition at a previous level into two equal partitions may increase the signaling overhead by one bit). For example, referring to FIGS. 9 and 11, UE 1104 may receive PSFCH resource sub-pool configuration 1110 (e.g., L3 configuration 960). For example, 1402 may be performed by PSFCH resource sub-pool configuration component 2240.

At 1404, the device may transmit, to a base station, a request for a resource allocation for (1) the particular SL transmission and (2) a corresponding HARQ feedback. The request may further include a requested PSFCH resource sub-pool partitioning level. The requested PSFCH resource sub-pool partitioning level may be one of the first partitioning level, the second partitioning level, or the third partitioning level for the example three-level partitioning described above.

The requested level of partitioning may be based on a traffic characteristic of the particular SL transmission, e.g., a number of UEs associated with the particular SL transmission (e.g., a size of a group associated with a groupcast (option 2) SL transmission) or a traffic type (e.g., unicast, groupcast (option 1), groupcast (option 2), or broadcast). Additionally, or alternatively, the request may include the traffic characteristic of the particular SL transmission related to a traffic characteristic criteria on which the base station may base an allocation of the particular PSFCH resource sub-pool. For example, the device may base a requested PSFCH resource sub-pool on a traffic characteristic criteria relating to the number of expected HARQ feedback transmission resources associated with the particular SL transmission. For a unicast transmission, or groupcast NACK-only (option 1) transmission, one PSFCH resource may be expected, while for a groupcast ACK/NACK (option 2) transmission the number of expected HARQ feedback transmission resources may be equal to the size of the groupcast group. Accordingly, for unicast or NACK-only groupcast, a partition at the highest level (e.g., the level with the least amount of resources per partition) may be requested, while for an ACK/NACK groupcast, a partition at a lower (or lowest) level (e.g., a level with an intermediate or largest amount of resources per partition) may be requested based on the size of the group. For example, referring to FIG. 11, UE 1104 may transmit SL resource allocation request 1112 to base station 1102. For example, 1404 may be performed by PSFCH resource selection component 2242.

At 1406, the device may receive, from the base station via a L1 signal, resource allocation information indicating the particular PSFCH resource sub-pool. The resource allocation information may include a SL resource allocation for a PSSCH/PSCCH and the PSRI indicating the PSFCH resource sub-pool for receiving HARQ feedback. The resource allocation information may also include a virtual 8-bit L1 source ID as described above in relation to FIG. 11. The resource allocation information may be transmitted through a L1 message (e.g., via DCI such as DCI 3-0). In some aspects, the PSRI may be indicated by a combination of a first CCE for PDCCH reception and a partial PSRI in a DCI (e.g., DCI 3-0) payload. For example, referring to FIG. 11, UE 1104 may receive SL resource allocation with PSRI and/or virtual L1 source ID 1116 from base station 1102. For example, 1406 may be performed by PSFCH resource selection component 2242.

At 1408, the device may select a particular PSFCH resource sub-pool for receiving HARQ feedback associated with the particular SL transmission. The particular PSFCH resource sub-pool may be selected, at 1408, from the multiple PSFCH resource sub-pools of a PSFCH resource pool for receiving HARQ feedback received at 1402. The device may select, at 1408, the particular PSFCH resource sub-pool indicated by the PSRI received, at 1406 (e.g., SL resource allocation 1116). For example, 1408 may be performed by PSFCH resource selection component 2242.

At 1410, the device may transmit, to at least one UE, a PSRI identifying the particular PSFCH resource sub-pool. The device may also transmit a virtual L1 source ID as described in relation to SL transmission 1118 of FIG. 11. The PSRI may be transmitted via a L1 message (e.g., SCI such as SCI-1 or SCI-2). The device (e.g., via the L1 message/SCI) may reserve N resources for transmissions and/or retransmissions of an SL transmission (e.g., a TB). For each transmission, the UE may reserve future time and frequency resources for an initial transmission and up to two retransmissions. The UE may transmit, for each of the reserved future time and frequency resources, a PSRI indicating an associated PSFCH resource sub-pool. For example, referring to FIGS. 9, 11, and 12, a UE 1104 or 1204 may transmit an SL transmission 1118 or 1212 with a PSRI (e.g., a three-digit indicator as described in relation to FIG. 9) to at least one UE (including UE 1106 or 1206). For example, 1410 may be performed by PSFCH resource selection component 2242.

Finally, at 1412, the device may receive, from the at least one UE, HARQ feedback regarding the particular SL transmission, the HARQ feedback being received via at least one PSFCH resource in the PSFCH resource sub-pool indicated by the PSRI. The PSFCH resource in the PSFCH resource sub-pool indicated by the PSRI may be selected by a receiving device based on an 8-bit L1 source identifier (K) associated with the transmitting device and a member ID (M) associated with the receiving device. The membership ID (M) may take a value M=0 for unicast or NACK-only (option 1) groupcast or may take a value M=[0, X−1] where X is the number of devices associated with an ACK/NACK (option 2) groupcast. For example, referring to FIGS. 9, 11, and 12, a UE 1104 or 1204 may receive HARQ feedback 1122 or 1216 from UE 1106 or 1206 based on the PSRI (e.g., a three-digit indicator as described in relation to FIG. 9), the 8-bit L1 source ID (K), and a membership ID (M) to at least one UE (including UE 1106 or 1206). For example, 1412 may be performed by HARQ feedback reception/transmission component 2244.

Figure 15:
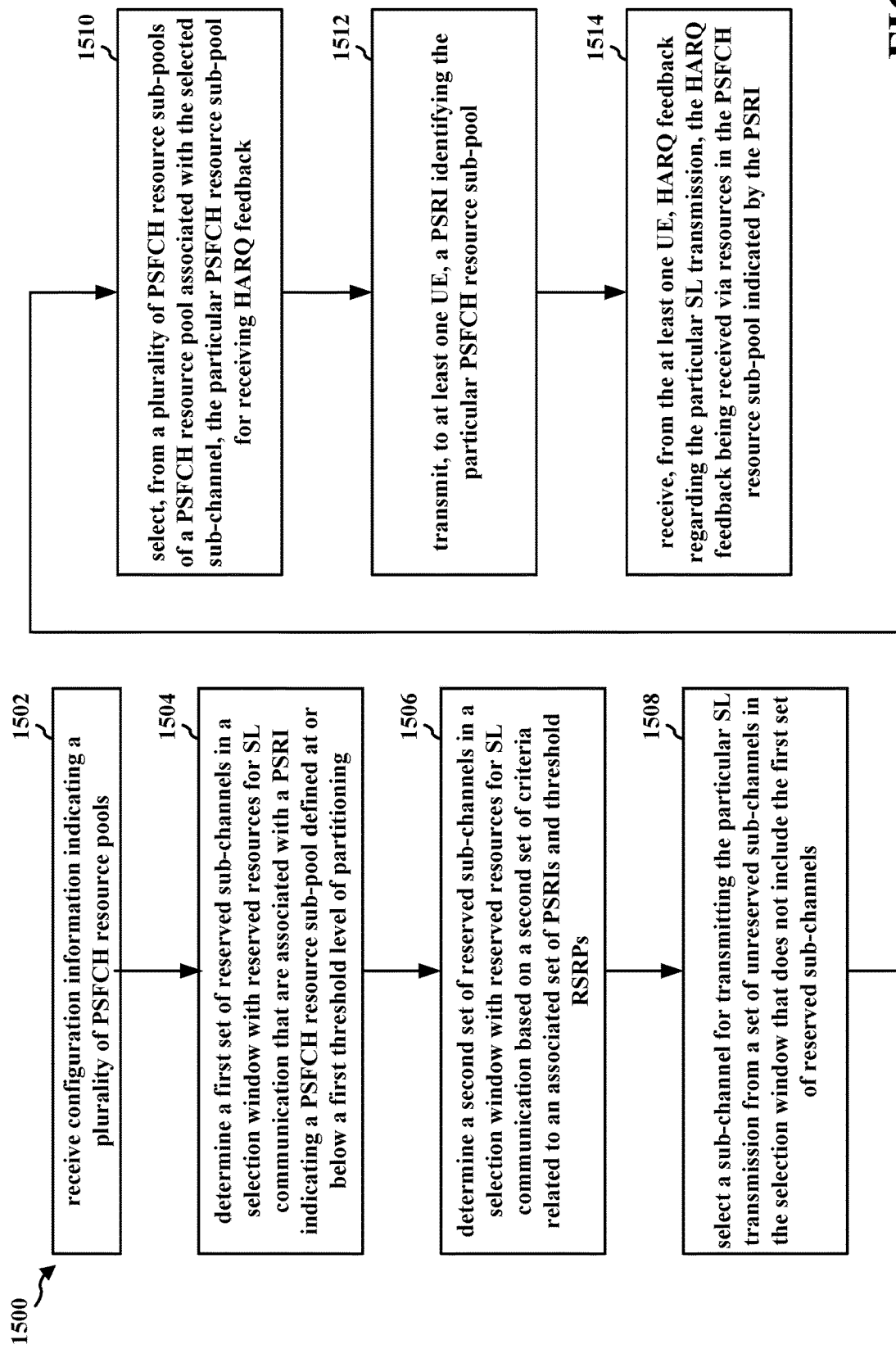
FIG. 15 is a flowchart of a method of wireless communication.

FIG. 15 is a flowchart 1500 of a method of wireless communication. The method may be performed by a sidelink-capable device (e.g., the UE 104, 402, 404, 406, 804, 1004, 1008, 1104, and/or 1204; the apparatus 2202). At 1502, the device may receive configuration information indicating a plurality of PSFCH resource sub-pools. The configuration information may be received via RRC signaling or via a SIB. The plurality of PSFCH resource sub-pools may be a plurality of nested PSFCH resource sub-pools for transmitting HARQ feedback associated with PSSCH transmissions via a particular sub-channel. The nested sub-pools may include PSFCH resource sub-pools defined at different levels of PSFCH resource pool partitioning. For example, a first-level partitioning defining a PSFCH resource sub-pool that includes all the resources in the PSFCH resource pool. A second-level partitioning may define a set of non-overlapping PSFCH resource sub-pools that each include an equal fraction (e.g., half) of the PSFCH resources in the PSFCH resource pool. A third-level partitioning defining a set of non-overlapping PSFCH resource sub-pools that each include an equal portion (e.g., one quarter) of the PSFCH resources in the PSFCH resource pool (or one half of the PSFCH resource pools at the second level). Additional levels may be defined but may increase the signaling overhead (e.g., each additional level dividing a partition at a previous level into two equal partitions may increase the signaling overhead by one bit). For example, referring to FIGS. 9 and 11, UE 1104 may receive PSFCH resource sub-pool configuration 1110 (e.g., L3 configuration 960). For example, 1502 may be performed by PSFCH resource sub-pool configuration component 2240.

At 1504, the device may determine a first set of reserved sub-channels in a selection window with reserved resources for SL communication that are associated with a PSRI indicating a PSFCH resource sub-pool defined at or below a first threshold level of partitioning (e.g., at the first-level partitioning including all the resources of the PSFCH resource pool associated with the sub-channel). Sub-channels in the first set of reserved sub-channels may not be good candidates for SL transmission resource selection as the possibility of HARQ collision may not be able to be avoided by PSFCH resource sub-pool selection. Determining the first set of reserved sub-channels may include receiving at least one PSRI from at least one UE via a SL transmission during a sensing window of a reservation operation associated with the particular SL transmission. In some aspects, the first set of reserved sub-channels is associated with at least one of (1) an RSRP that is above a second threshold RSRP that is less than the first threshold RSRP or (2) an RSRP that is measurable by the device.

At 1506, the device may determine a second set of reserved sub-channels in the selection window with reserved resources for SL communication based on a set of criteria related to an associated set of PSRIs and threshold RSRPs. The set of criteria for inclusion in the second set of sub-channels may include being associated with a PSRI indicating a PSFCH resource sub-pool defined at a level of partitioning that is at or below a second threshold level of partitioning and above the first threshold level of partitioning (e.g., that are associated with a second-level partitioning). The set of criteria for inclusion in the second set of sub-channels may include being associated with a RSRP that is above a first threshold RSRP.

At 1508, the device may select a sub-channel for transmitting the particular SL transmission from a set of unreserved sub-channels in the selection window that does not include the first set of reserved sub-channels. In some aspects, the set of unreserved sub-channels in the selection window may also not include the second set of reserved sub-channels.

At 1510, the device may select, from a plurality of PSFCH resource sub-pools of a PSFCH resource pool associated with the selected sub-channel, the particular PSFCH resource sub-pool for receiving HARQ feedback. The particular PSFCH resource sub-pool may be selected, at 1508, from the multiple PSFCH resource sub-pools of a PSFCH resource pool for receiving HARQ feedback received at 1502.

The selected level of partitioning may be based on a traffic characteristic of the particular SL transmission, e.g., a number of UEs associated with the particular SL transmission (e.g., a size of a group associated with a groupcast (option 2) SL transmission) or a traffic type (e.g., unicast, groupcast (option 1), groupcast (option 2), or broadcast). For example, the device may base a selected PSFCH resource sub-pool on a traffic characteristic criteria relating to the number of expected HARQ feedback transmission resources associated with the particular SL transmission. For a unicast transmission, or groupcast NACK-only (option 1) transmission, one PSFCH resource may be expected, while for a groupcast ACK/NACK (option 2) transmission the number of expected HARQ feedback transmission resources may be equal to the size of the groupcast group. Accordingly, for unicast or NACK-only groupcast, a partition at the highest level (e.g., the level with the least amount of resources per partition) may be selected, while for an ACK/NACK groupcast, a partition at a lower (or lowest) level (e.g., a level with an intermediate or largest amount of resources per partition) may be selected based on the size of the group. For example, referring to FIG. 12, UE 1204 may select 1210 SL resources and a PSFCH resource sub-pool. For example, 1510 may be performed by PSFCH resource selection component 2242.

At 1512, the device may transmit, to at least one UE, a PSRI identifying the particular PSFCH resource sub-pool. The PSRI may be transmitted via a L1 message (e.g., SCI such as SCI-1 or SCI-2). The device (e.g., via the L1 message/SCI) may reserve N resources for transmissions and/or retransmissions of an SL transmission (e.g., a TB). For each transmission, the UE may reserve future time and frequency resources for an initial transmission and up to two retransmissions. The UE may transmit, for each of the reserved future time and frequency resources, a PSRI indicating an associated PSFCH resource sub-pool. For example, referring to FIGS. 9 and 12, a UE 1204 may transmit an SL transmission 1212 with a PSRI (e.g., a three-digit indicator as described in relation to FIG. 9) to at least one UE (including UE 1206). For example, 1512 may be performed by PSFCH resource selection component 2242.

Finally, at 1514, the device may receive, from the at least one UE, HARQ feedback regarding the particular SL transmission, the HARQ feedback being received via at least one PSFCH resource in the PSFCH resource sub-pool indicated by the PSRI. The PSFCH resource in the PSFCH resource sub-pool indicated by the PSRI may be selected by a receiving device based on an 8-bit L1 source identifier (K) associated with the transmitting device and a member ID (M) associated with the receiving device. The membership ID (M) may take a value M=0 for unicast or NACK-only (option 1) groupcast or may take a value M=[0, X−1] where X is the number of devices associated with an ACK/NACK (option 2) groupcast. For example, referring to FIGS. 9 and 12, a UE 1204 may receive HARQ feedback 1216 from UE 1206 based on the PSRI (e.g., a three-digit indicator as described in relation to FIG. 9), the 8-bit L1 source ID (K), and a membership ID (M) to at least one UE (including UE 1206). For example, 1514 may be performed by HARQ feedback reception/transmission component 2244.

Figure 16:
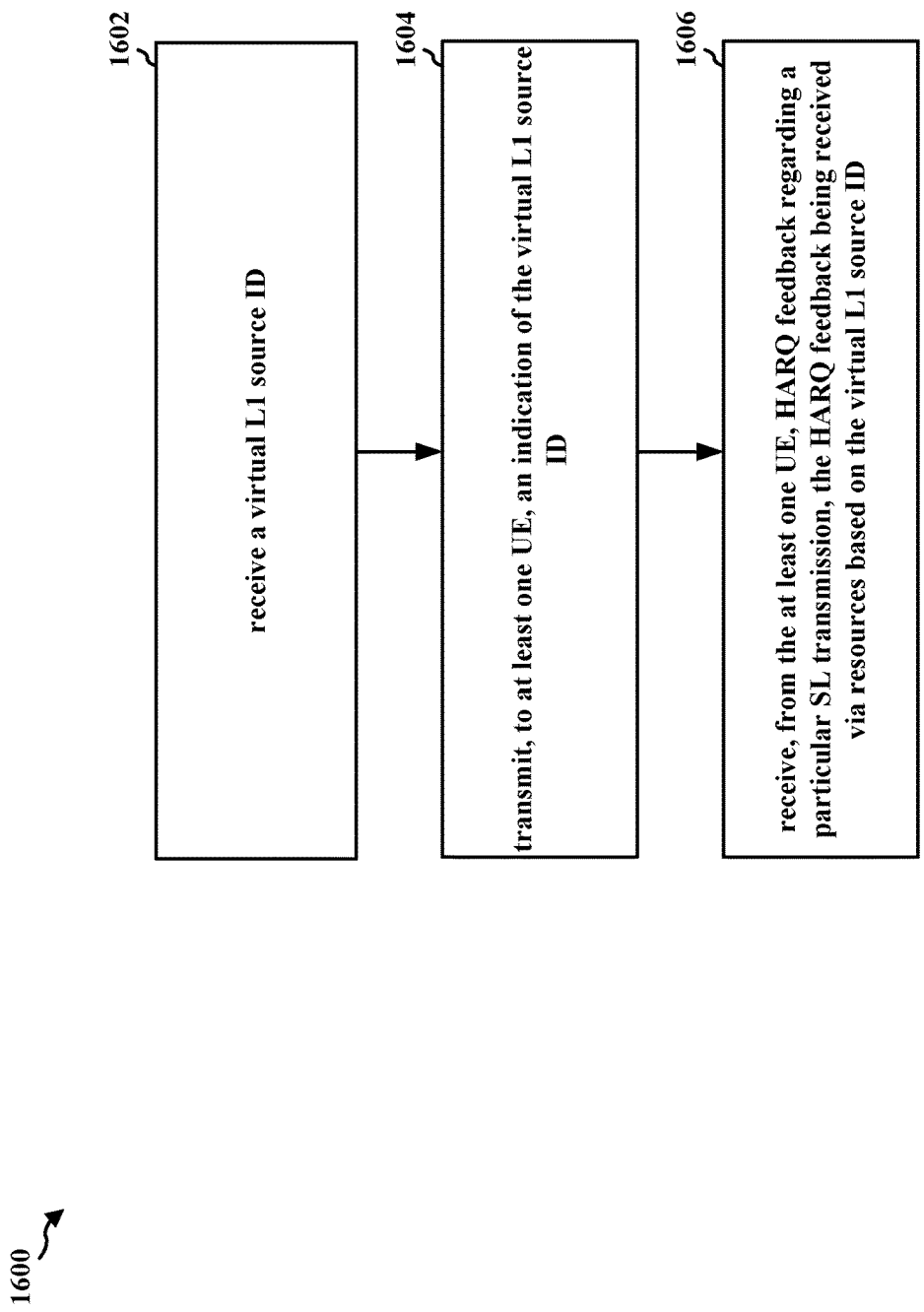
FIG. 16 is a flowchart of a method of wireless communication.

FIG. 16 is a flowchart 1600 of a method of wireless communication. The method may be performed by a sidelink-capable device (e.g., the UE 104, 402, 404, 406, 804, 1004, 1008, 1104, and/or 1204; the apparatus 2202). At 1602, the device may receive a virtual 8-bit L1 source ID. The virtual 8-bit L1 source ID may be received from a base station. Receiving, at 1602, the virtual 8-bit L1 source ID may include transmitting a request for a resource allocation to a base station and receiving resource allocation information for a SL transmission and the virtual 8-bit L1 source ID (e.g., via a L1 signal such as DCI). For example, referring to FIG. 11, UE 1104 may receive SL resource allocation with a virtual L1 source ID 1116 from base station 1102. For example, 1602 may be performed by PSFCH resource selection component 2242.

At 1604, the device may transmit, to at least one UE an indication of the virtual L1 source ID. The indication of the virtual L1 source ID may be transmitted via a L1 message (e.g., SCI such as SCI-1 or SCI-2) associating the virtual L1 source ID with the SL transmission. The device (e.g., via the L1 message/SCI) may reserve N resources for transmissions and/or retransmissions of an SL transmission (e.g., a TB). For each transmission, the UE may reserve future time and frequency resources for an initial transmission and up to two retransmissions. For example, referring to FIG. 11, a UE 1104 may transmit an SL transmission 1118 with the virtual L1 source ID to at least one UE (including UE 1106). For example, 1604 may be performed by PSFCH resource selection component 2242.

Finally, at 1606, the device may receive, from the at least one UE, HARQ feedback regarding the particular SL transmission, the HARQ feedback being received via resources from a PSFCH resource pool associated with the resources allocated for the SL transmission selected based on the virtual L1 source ID (e.g., as described in FIGS. 6 and 8 for non-virtual L1 source IDs "K"). The PSFCH resource in the PSFCH resource pool associated with the resources allocated for the SL transmission may be selected by a receiving device based on the virtual 8-bit L1 source identifier (K) associated with the transmitting device and a member ID (M) associated with the receiving device. The membership ID (M) may take a value M=0 for unicast or NACK-only (option 1) groupcast or may take a value M=[0, X−1] where X is the number of devices associated with an ACK/NACK (option 2) groupcast. For example, referring to FIG. 11, a UE 1104 may receive HARQ feedback 1122 from UE 1106 based on the virtual 8-bit L1 source ID (K), and a membership ID (M) from at least one UE (including UE 1106). For example, 1606 may be performed by HARQ feedback reception/transmission component 2244.

Figure 17:
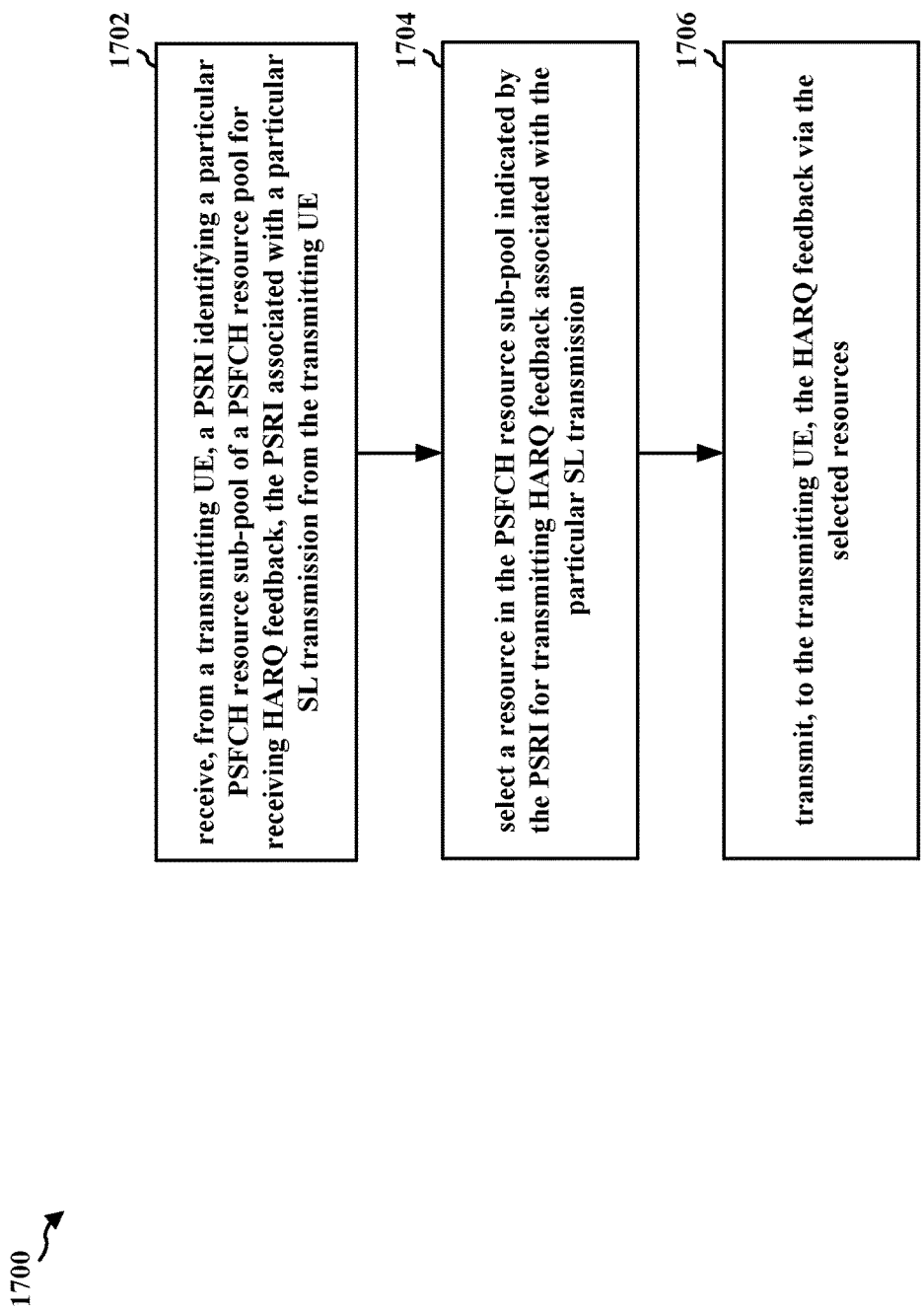
FIG. 17 is a flowchart of a method of wireless communication.

FIG. 17 is a flowchart 1700 of a method of wireless communication. The method may be performed by a sidelink-capable device (e.g., the UE 104, 402, 404, 406, 805, 806, 1005, 1006, 1106, and/or 1206; the apparatus 2202). At 1702, the device may receive, from a transmitting UE, a PSRI identifying a particular PSFCH resource sub-pool of a PSFCH resource pool for receiving HARQ feedback, the PSRI associated with a particular SL transmission from the transmitting UE. The PSRI may be received via a L1 message (e.g., SCI such as SCI-1 or SCI-2). For example, referring to FIGS. 9, 11, and 12, a UE 1106 or 1206 may receive an SL transmission 1118 or 1212 with a PSRI (e.g., a three-digit indicator as described in relation to FIG. 9) from a transmitting UE (including UE 1104 or 1204). For example, 1702 may be performed by PSFCH resource selection component 2242.

For example, the particular PSFCH resource sub-pool may be one of a plurality of PSFCH resource sub-pools for transmitting HARQ feedback (e.g., PSFCH resource sub-pools indicated by any of the three-digit PSRIs {000, 001, . . . , 110} indicated in FIG. 9) and the plurality of PSFCH resource sub-pools may include PSFCH resource sub-pools defined at different levels of PSFCH resource pool partitioning. The different levels of PSFCH resource pool partitioning may include at least a first-level ("0$^{th}$ level" partitioning 920) defining a PSFCH resource sub-pool that includes all the resources in the PSFCH resource pool, a second-level partitioning ("1$^{st}$ level" partitioning 930) defining a set of non-overlapping PSFCH resource sub-pools that each include half of the PSFCH resources in the PSFCH resource pool, and a third-level partitioning ("2$^{nd}$ level" partitioning 940) defining a set of non-overlapping PSFCH resource sub-pools that each include one quarter of the PSFCH resources in the PSFCH resource pool. The particular PSFCH resource sub-pool may be a particular PSFCH resource sub-pool defined at one of the first partitioning level, the second partitioning level, or the third partitioning level.

At 1704, the device may select a resource in the PSFCH resource sub-pool indicated by the PSRI for transmitting HARQ feedback associated with the particular SL transmission. Selecting, at 1704, the resource in the PSFCH resource sub-pool indicated by the PSRI may be based on a hashing function based on (1) the PSRI, (2) the received L1 source ID, and (3) a value associated with the UE. For example, referring to FIGS. 9, 11, and 12, UEs 1106 (or 1206) may select 1120 (or 1214) a PSFCH resource based on the PSRI, a received (virtual or unmodified) L1 source ID, and a value (e.g., member ID) associated with the UE 1106 (or 1206) (e.g., based on the PSFCH-HARQ resource selection algorithm 970). The PSFCH resource in the PSFCH resource sub-pool indicated by the PSRI may be selected by the device (e.g., UE 1106 or 1206) device based on an 8-bit L1 source identifier (K) associated with the transmitting device and a member ID (M) associated with the receiving device. The membership ID (M) may take a value M=0 for unicast or NACK-only (option 1) groupcast or may take a value M=[0, X−1] where X is the number of devices associated with an ACK/NACK (option 2) groupcast. For example, 1704 may be performed by PSFCH resource selection component 2242.

Finally, at 1706, the device may transmit, to the transmitting UE, HARQ feedback via the selected resources. Where the selected resources are resources in the PSFCH resource sub-pool indicated by the PSRI. For example, referring to FIGS. 9, 11, and 12, a UE 1106 or 1206 may transmit HARQ feedback 1122 or 1216 to UE 1104 or 1204 via the PSFCH resource in the indicated PSFCH resource sub-pool that the UE 1106 or 1206 may select based on the PSRI (e.g., a three-digit indicator as described in relation to FIG. 9), the 8-bit L1 source ID (K), and a membership ID (M). For example, 1706 may be performed by HARQ feedback reception/transmission component 2244.

Figure 18:
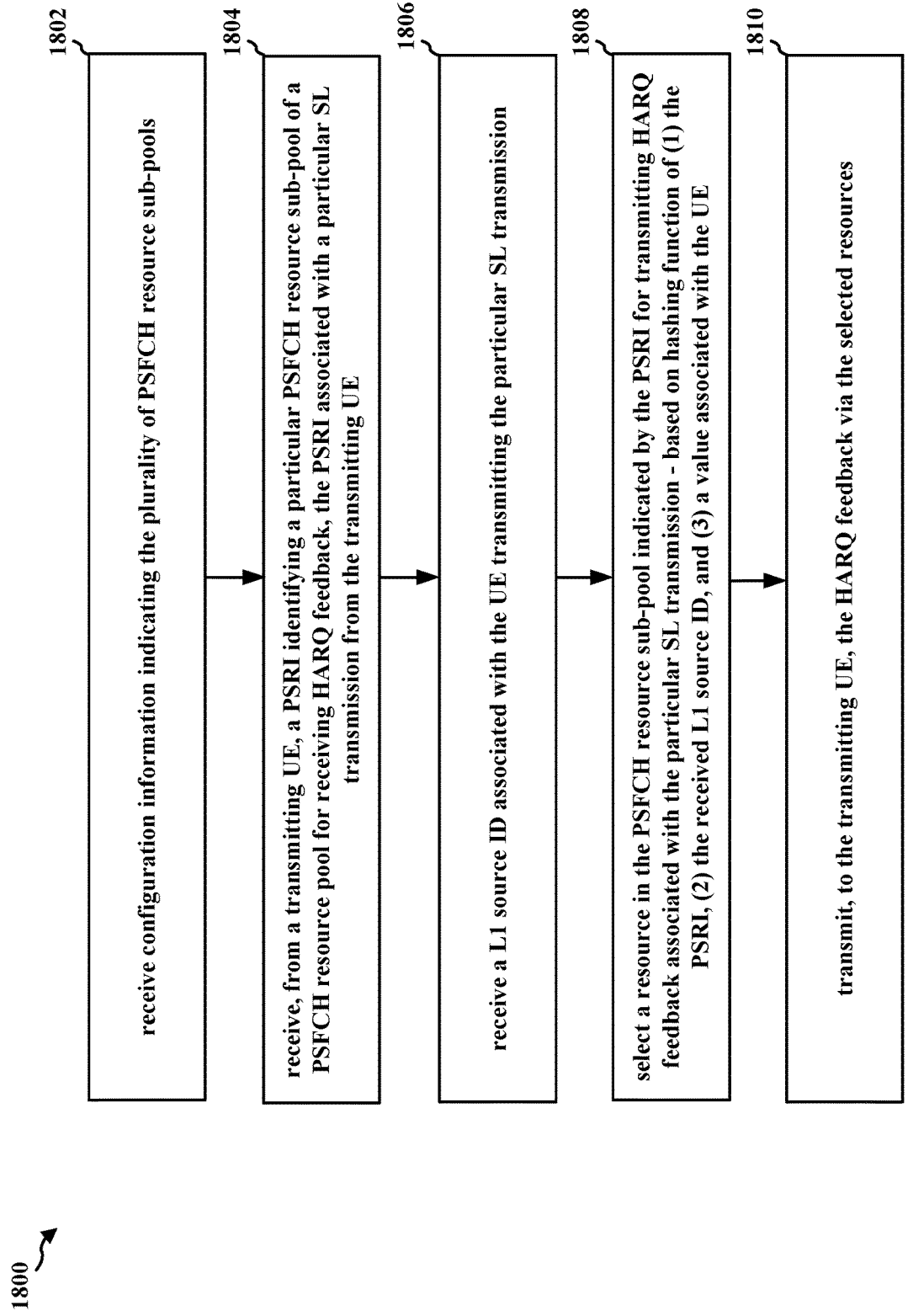
FIG. 18 is a flowchart of a method of wireless communication.

FIG. 18 is a flowchart 1800 of a method of wireless communication. The method may be performed by a sidelink-capable device (e.g., the UE 104, 402, 404, 406, 805, 806, 1005, 1006, 1106, and/or 1206; the apparatus 2202). At 1802, the device may receive configuration information indicating a plurality of PSFCH resource sub-pools. The configuration information may be received via L3 signaling (e.g., RRC signaling or via a SIB) from a base station. In some aspects, the configuration information indicating a plurality of PSFCH resource sub-pools may be pre-configured. The plurality of PSFCH resource sub-pools may include PSFCH resource sub-pools defined at different levels of PSFCH resource pool partitioning. The different levels of PSFCH resource pool partitioning may include at least a first-level ("$0^{th}$ level" partitioning 920) defining a PSFCH resource sub-pool that includes all the resources in the PSFCH resource pool, a second-level partitioning ("$1^{st}$ level" partitioning 930) defining a set of non-overlapping PSFCH resource sub-pools that each include half of the PSFCH resources in the PSFCH resource pool, and a third-level partitioning ("$2^{nd}$ level" partitioning 940) defining a set of non-overlapping PSFCH resource sub-pools that each include one quarter of the PSFCH resources in the PSFCH resource pool. The particular PSFCH resource sub-pool may be a particular PSFCH resource sub-pool defined at one of the first partitioning level, the second partitioning level, or the third partitioning level. For example, referring to FIGS. 9, 11, and 12, UE 1104 may receive PSFCH resource sub-pool configuration 1110 (or a UE 1206 may activate 1208B a pre-configured nested PSFCH resource sub-pool structure) indicating the PSFCH resource partitions at the $0^{th}$ through $2^{nd}$ partitioning levels 920-940. For example, 1802 may be performed by PSFCH resource sub-pool configuration component 2240.

At 1804, the device may receive, from a transmitting UE, a PSRI identifying a particular PSFCH resource sub-pool of a PSFCH resource pool for receiving HARQ feedback, the PSRI associated with a particular SL transmission from the transmitting UE. For example, the particular PSFCH resource sub-pool may be one of the plurality of PSFCH resource sub-pools for transmitting HARQ feedback in the activated 1208B pre-configuration (e.g., PSFCH resource sub-pools indicated by any of the three-digit PSRIs {000, 001, . . . , 110} indicated in FIG. 9). The PSRI may be received via a L1 message (e.g., SCI such as SCI-1 or SCI-2). For example, referring to FIGS. 9, 11, and 12, a UE 1106 or 1206 may receive an SL transmission 1118 or 1212 with a PSRI (e.g., a three-digit indicator as described in relation to FIG. 9) from a transmitting UE (including UE 1104 or 1204). For example, 1804 may be performed by PSFCH resource selection component 2242.

At 1806, the device may receive a L1 source ID associated with the UE transmitting the particular SL transmission. The L1 source ID may be an 8-bit source ID that is the LSB of a 24-bit L2 ID. The L1 source ID may be an unmodified (e.g., device-generated) L1 source ID or may be a virtual L1 source ID as described above in relation to allocation 1114. For example, 1806 may be performed by PSFCH resource selection component 2242.

At 1808, the device may select a resource in the PSFCH resource sub-pool indicated by the PSRI for transmitting HARQ feedback associated with the particular SL transmission. Selecting, at 1808, the resource in the PSFCH resource sub-pool indicated by the PSRI may be based on a hashing function based on (1) the PSRI, (2) the received L1 source ID, and (3) a value associated with the UE. For example, referring to FIGS. 9, 11, and 12, UEs 1106 (or 1206) may select 1120 (or 1214) a PSFCH resource based on the PSRI, a received (virtual or unmodified) L1 source ID, and a value (e.g., member ID) associated with the UE 1106 (or 1206) (e.g., based on the PSFCH-HARQ resource selection algorithm 970). The PSFCH resource in the PSFCH resource sub-pool indicated by the PSRI may be selected by the device (e.g., UE 1106 or 1206) device based on an 8-bit L1 source identifier (K) associated with the transmitting device and a member ID (M) associated with the receiving device. The membership ID (M) may take a value M=0 for unicast or NACK-only (option 1) groupcast or may take a value M=[0, X−1] where X is the number of devices associated with an ACK/NACK (option 2) groupcast. For example, 1808 may be performed by PSFCH resource selection component 2242.

Finally, at 1810, the device may transmit, to the transmitting UE, HARQ feedback via the selected resources. Where the selected resources are resources in the PSFCH resource sub-pool indicated by the PSRI. For example, referring to FIGS. 9, 11, and 12, a UE 1106 or 1206 may transmit HARQ feedback 1122 or 1216 to UE 1104 or 1204 via the PSFCH resource in the indicated PSFCH resource sub-pool that the UE 1106 or 1206 may select based on the PSRI (e.g., a three-digit indicator as described in relation to FIG. 9), the 8-bit L1 source ID (K), and a membership ID (M). For example, 1810 may be performed by HARQ feedback reception/transmission component 2244.

Figure 19:
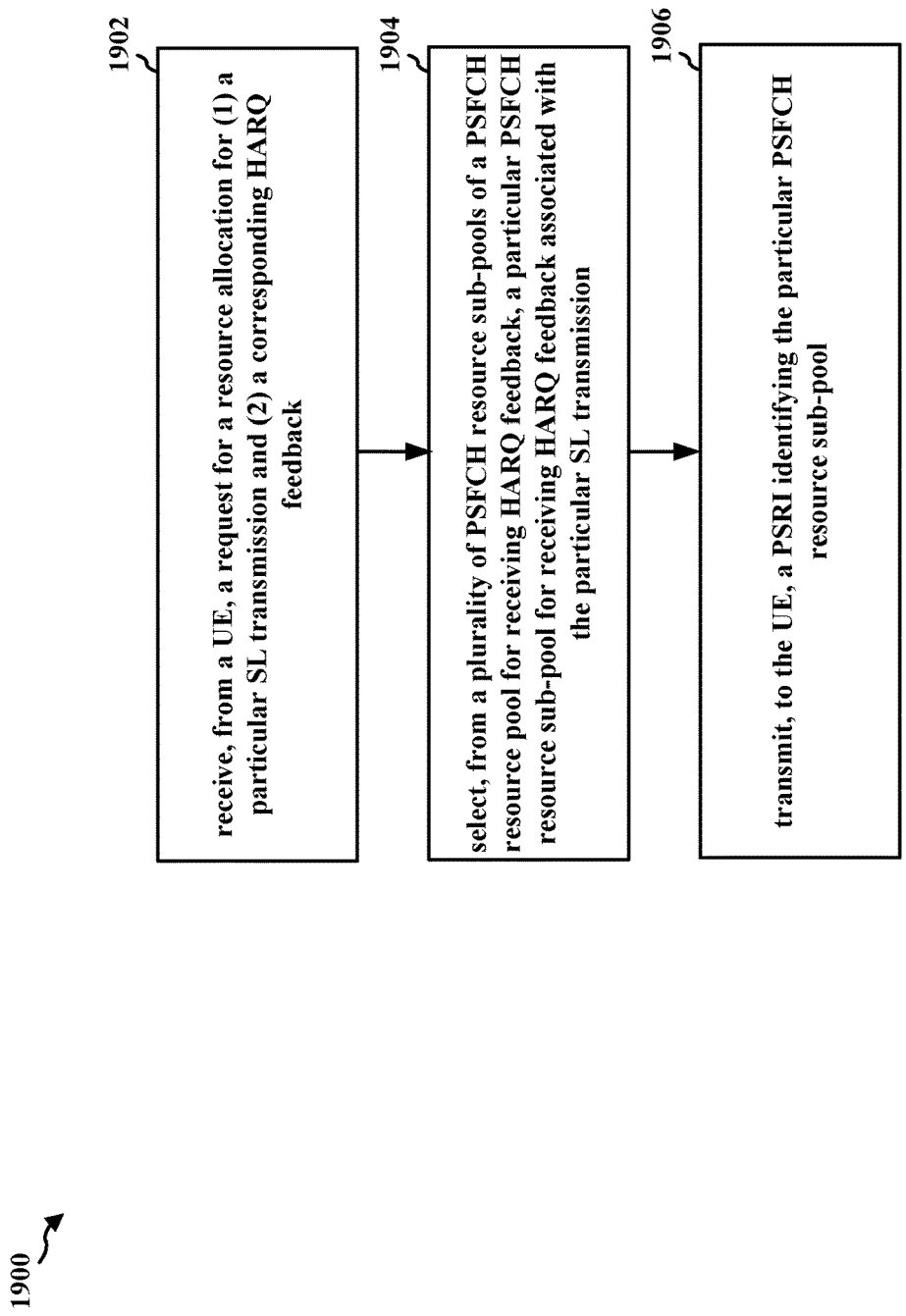
FIG. 19 is a flowchart of a method of wireless communication.

FIG. 19 is a flowchart 1900 of a method of wireless communication. The method may be performed by a base station (e.g., the base station 102, 1002, and/or 1102; the apparatus 2302). At 1902, the base station may receive, from a UE, a request for a resource allocation for (1) a particular SL transmission and (2) a corresponding HARQ feedback. The request may further include a requested PSFCH resource sub-pool partitioning level. The requested PSFCH resource sub-pool partitioning level may be one of the first partitioning level, the second partitioning level, or the third partitioning level for the example three-level partitioning described in FIG. 9. For example, referring to FIG. 11, the base station 1102 may receive SL resource allocation request 1112 from UE 1104.

The requested level of partitioning may be based on a traffic characteristic of the particular SL transmission, e.g., a number of UEs associated with the particular SL transmission (e.g., a size of a group associated with a groupcast (option 2) SL transmission) or a traffic type (e.g., unicast, groupcast (option 1), groupcast (option 2), or broadcast). Additionally, or alternatively, the request may include the traffic characteristic of the particular SL transmission related to a traffic characteristic criteria on which the base station may base an allocation of the particular PSFCH resource sub-pool. For example, referring to FIG. 11, base station 1102 may receive SL resource allocation request 1112 from UE 1104. For example, 1902 may be performed by PSFCH resource selection component 2342.

At 1904, the base station may select, from a plurality of PSFCH resource sub-pools of a PSFCH resource pool for receiving HARQ feedback, a particular PSFCH resource sub-pool for receiving HARQ feedback associated with the particular SL transmission. For example, referring to FIG. 11, the base station may allocate 1114 a PSSCH resource (e.g., sub-channel(s) and slot(s)) for the SL transmission. The base station 1102 may further allocate a PSFCH resource sub-pool and/or a virtual 8-bit L1 source ID. The base station may allocate a PSFCH resource sub-pool based on multiple requests for SL resources from multiple devices. For example, if a large number of requests are made for SL transmissions within a same time interval (e.g., a set of slots), the base station 1102 may perform spatial reuse of PSSCH resources such that at least one set of two (or more) devices that are separated by a threshold distance or by intervening objects blocking SL transmissions may be allocated a same PSSCH resource (as described above in relation to FIG. 10). In order to avoid a HARQ feedback collision, the base station 1102 may determine whether the 8-bit L1 source IDs of the two devices are the same. If the 8-bit L1 source IDs are the same, the base station may allocate different PSFCH resource sub-pools to each of the two devices. Alternatively, or additionally, the base station 1102 may generate a virtual 8-bit L1 source ID for one or both of the devices to avoid a HARQ collision. For example, 1904 may be performed by PSFCH resource selection component 2342.

The allocation of either (1) different PSFCH resource sub-pools or (2) at least one virtual 8-bit L1 source ID may be based on the traffic type of the SL transmissions for which resources are requested. For example, if SL transmissions from both devices are associated with an ACK/NACK groupcast, the base station may allocate different PSFCH resource sub-pools to allow for each group to use all the available PSFCH resources in the different PSFCH resource sub-pools without HARQ feedback collisions. If SL transmissions from both devices are associated with an unicast or NACK-only groupcast, the base station may allocate a same PSFCH resource sub-pool and generate a virtual 8-bit L1 source ID for at least one device that is different from the 8-bit L1 source ID (virtual or unmodified) of the other device to avoid HARQ feedback collisions while allowing other PSFCH resource sub-pools to be used for other ACK/NACK groupcast transmissions or to be repurposed for other types of transmissions (e.g., low-bit control information).

In some aspects, e.g., when a first device is requesting SL resources for a unicast transmission and a second device is requesting SL resources for transmission of an ACK/NACK groupcast, the base station 1102 may allocate the same PSFCH resource sub-pool to both devices and assign a virtual 8-bit L1 source ID to one of the devices to minimize the likelihood of a HARQ feedback collision. For example, the first (or second) device may be assigned a virtual 8-bit L1 source ID that is one below (or above) the 8-bit L1 source ID of the second (or first) device. By assigning such a virtual 8-bit L1 source ID, the resources selected by the group members associated with the groupcast transmission can lead to a HARQ feedback collision if the number of devices associated with the groupcast (e.g., groupcast members) is at least as large as the number of resources in the (shared) PSFCH resource sub-pool. A similar use of virtual 8-bit L1 source IDs may be employed for devices with known group sizes associated with an ACK/NACK groupcast, such that a virtual 8-bit L1 source ID may be assigned to one or both devices such that the virtual IDs are separated by at least as many members of the group associated with the device assigned the lower virtual ID.

At 1906, the base station may transmit, to the UE, resource allocation information indicating the particular PSFCH resource sub-pool. The resource allocation information may include a SL resource allocation for a PSSCH/PSCCH and the PSRI indicating the PSFCH resource sub-pool for receiving HARQ feedback. The resource allocation information may also include a virtual 8-bit L1 source ID as described above in relation to FIG. 11. The resource allocation information may be transmitted through a L1 message (e.g., via DCI such as DCI 3-0). In some aspects, the PSRI may be indicated by a combination of a first CCE for PDCCH reception and a partial PSRI in a DCI (e.g., DCI 3-0) payload. For example, referring to FIG. 11, base station 1102 may transmit SL resource allocation with PSRI and/or virtual L1 source ID 1116 to UE 1104. For example, 1906 may be performed by PSFCH resource transmission component 2344.

Figure 20:
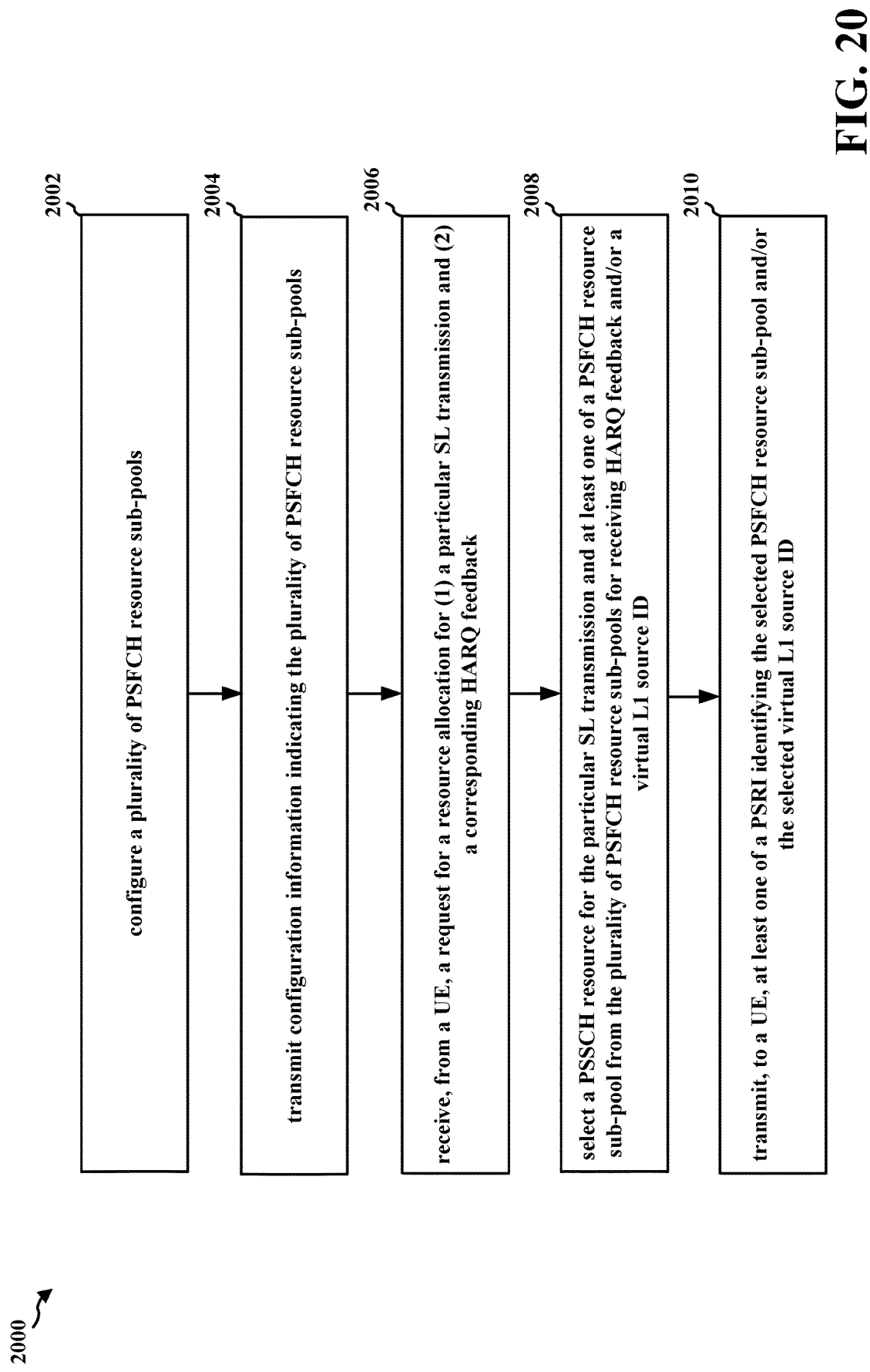
FIG. 20 is a flowchart of a method of wireless communication.

FIG. 20 is a flowchart 2000 of a method of wireless communication. The method may be performed by a base station (e.g., the base station 102, 1002, and/or 1102; the apparatus 2302). At 2002, the device may configure a plurality of PSFCH resource sub-pools. For example, referring to FIG. 9, the device may configure a plurality of PSFCH resource sub-pools associated with a plurality of PSRIs (e.g., three-digit indicators as described in relation to in L3 (pre-)configuration 960). For example, 2002 may be performed by PSFCH resource sub-pool configuration component 2340.

For example, the configured plurality of PSFCH resource sub-pools may be a plurality of PSFCH resource sub-pools for transmitting HARQ feedback (e.g., PSFCH resource sub-pools indicated by any of the three-digit PSRIs {000, 001, . . . , 110} indicated in FIG. 9) and the plurality of PSFCH resource sub-pools may include PSFCH resource sub-pools defined at different levels of PSFCH resource pool partitioning. The different levels of PSFCH resource pool partitioning may include at least a first-level ("0$^{th}$ level" partitioning 920) defining a PSFCH resource sub-pool that includes all the resources in the PSFCH resource pool, a second-level partitioning ("1$^{st}$ level" partitioning 930) defining a set of non-overlapping PSFCH resource sub-pools that each include half of the PSFCH resources in the PSFCH resource pool, and a third-level partitioning ("2$^{nd}$ level" partitioning 940) defining a set of non-overlapping PSFCH resource sub-pools that each include one quarter of the PSFCH resources in the PSFCH resource pool. The particular PSFCH resource sub-pool may be a particular PSFCH resource sub-pool defined at one of the first partitioning level, the second partitioning level, or the third partitioning level.

At 2004, the device may transmit configuration information indicating the plurality of configured PSFCH resource sub-pools to at least one UE. For example, referring to FIGS. 9 and 11, a base station 1102 may transmit L3 configuration 960 as PSFCH resource sub-pool configuration 1110 to at least one UE (e.g., UEs 1104 and 1106). The PSFCH resource sub-pool configuration 1110 may be transmitted via RRC signaling or via a SIB (e.g., L3 signaling). For example, 2004 may be performed by PSFCH resource sub-pool configuration component 2344.

At 2006, the base station may receive, from a UE, a request for a resource allocation for (1) a particular SL transmission and (2) a corresponding HARQ feedback. The request may further include a requested PSFCH resource sub-pool partitioning level. The requested PSFCH resource sub-pool partitioning level may be one of the first partitioning level, the second partitioning level, or the third partitioning level for the example three-level partitioning described in FIG. 9. For example, referring to FIG. 11, the base station 1102 may receive SL resource allocation request 1112 from UE 1104.

The requested level of partitioning may be based on a traffic characteristic of the particular SL transmission, e.g., a number of UEs associated with the particular SL transmission (e.g., a size of a group associated with a groupcast (option 2) SL transmission) or a traffic type (e.g., unicast, groupcast (option 1), groupcast (option 2), or broadcast). Additionally, or alternatively, the request may include the traffic characteristic of the particular SL transmission related to a traffic characteristic criteria on which the base station may base an allocation of the particular PSFCH resource sub-pool. For example, referring to FIG. 11, base station 1102 may receive SL resource allocation request 1112 from UE 1104. For example, 2006 may be performed by PSFCH resource selection component 2342.

At 2008, the base station may select, from a plurality of PSFCH resource sub-pools of a PSFCH resource pool for receiving HARQ feedback, a particular PSFCH resource sub-pool for receiving HARQ feedback associated with the particular SL transmission. For example, referring to FIG. 11, the base station may allocate 1114 a PSSCH resource (e.g., sub-channel(s) and slot(s)) for the SL transmission. The base station 1102 may further allocate a PSFCH resource sub-pool and/or a virtual 8-bit L1 source ID. The base station may allocate a PSFCH resource sub-pool based on multiple requests for SL resources from multiple devices. For example, if a large number of requests are made for SL transmissions within a same time interval (e.g., a set of slots), the base station 1102 may perform spatial reuse of PSSCH resources such that at least one set of two (or more) devices that are separated by a threshold distance or by intervening objects blocking SL transmissions may be allocated a same PSSCH resource (as described above in relation to FIG. 10). In order to avoid a HARQ feedback collision, the base station 1102 may determine whether the 8-bit L1 source IDs of the two devices are the same. If the 8-bit L1 source IDs are the same, the base station may allocate different PSFCH resource sub-pools to each of the two devices. Alternatively, or additionally, the base station 1102 may generate a virtual 8-bit L1 source ID for one or both of the devices to avoid a HARQ collision. For example, 2008 may be performed by PSFCH resource selection component 2342.

The allocation of either (1) different PSFCH resource sub-pools or (2) at least one virtual 8-bit L1 source ID may be based on the traffic type of the SL transmissions for which resources are requested. For example, if SL transmissions from both devices are associated with an ACK/NACK groupcast, the base station may allocate different PSFCH resource sub-pools to allow for each group to use all the available PSFCH resources in the different PSFCH resource sub-pools without HARQ feedback collisions. If SL transmissions from both devices are associated with an unicast or NACK-only groupcast, the base station may allocate a same PSFCH resource sub-pool and generate a virtual 8-bit L1 source ID for at least one device that is different from the 8-bit L1 source ID (virtual or unmodified) of the other device to avoid HARQ feedback collisions while allowing other PSFCH resource sub-pools to be used for other ACK/NACK groupcast transmissions or to be repurposed for other types of transmissions (e.g., low-bit control information).

In some aspects, e.g., when a first device is requesting SL resources for a unicast transmission and a second device is requesting SL resources for transmission of an ACK/NACK groupcast, the base station 1102 may allocate the same PSFCH resource sub-pool to both devices and assign a virtual 8-bit L1 source ID to one of the devices to minimize the likelihood of a HARQ feedback collision. For example, the first (or second) device may be assigned a virtual 8-bit L1 source ID that is one below (or above) the 8-bit L1 source ID of the second (or first) device. By assigning such a virtual 8-bit L1 source ID, the resources selected by the group members associated with the groupcast transmission can lead to a HARQ feedback collision if the number of devices associated with the groupcast (e.g., groupcast members) is at least as large as the number of resources in the (shared) PSFCH resource sub-pool. A similar use of virtual 8-bit L1 source IDs may be employed for devices with known group sizes associated with an ACK/NACK groupcast, such that a virtual 8-bit L1 source ID may be assigned to one or both devices such that the virtual IDs are separated by at least as many members of the group associated with the device assigned the lower virtual ID.

At 2010, the base station may transmit, to the UE, resource allocation information indicating the particular PSFCH resource sub-pool. The resource allocation information may include a SL resource allocation for a PSSCH/PSCCH and the PSRI indicating the PSFCH resource sub-pool for receiving HARQ feedback. The resource allocation information may also include a virtual 8-bit L1 source ID as described above in relation to FIG. 11. The resource allocation information may be transmitted through a L1 message (e.g., via DCI such as DCI 3-0). In some aspects, the PSRI may be indicated by a combination of a first CCE for PDCCH reception and a partial PSRI in a DCI (e.g., DCI 3-0) payload. For example, referring to FIG. 11, base station 1102 may transmit SL resource allocation with PSRI and/or virtual L1 source ID 1116 to UE 1104. For example, 2010 may be performed by PSFCH resource transmission component 2344.

Figure 21:
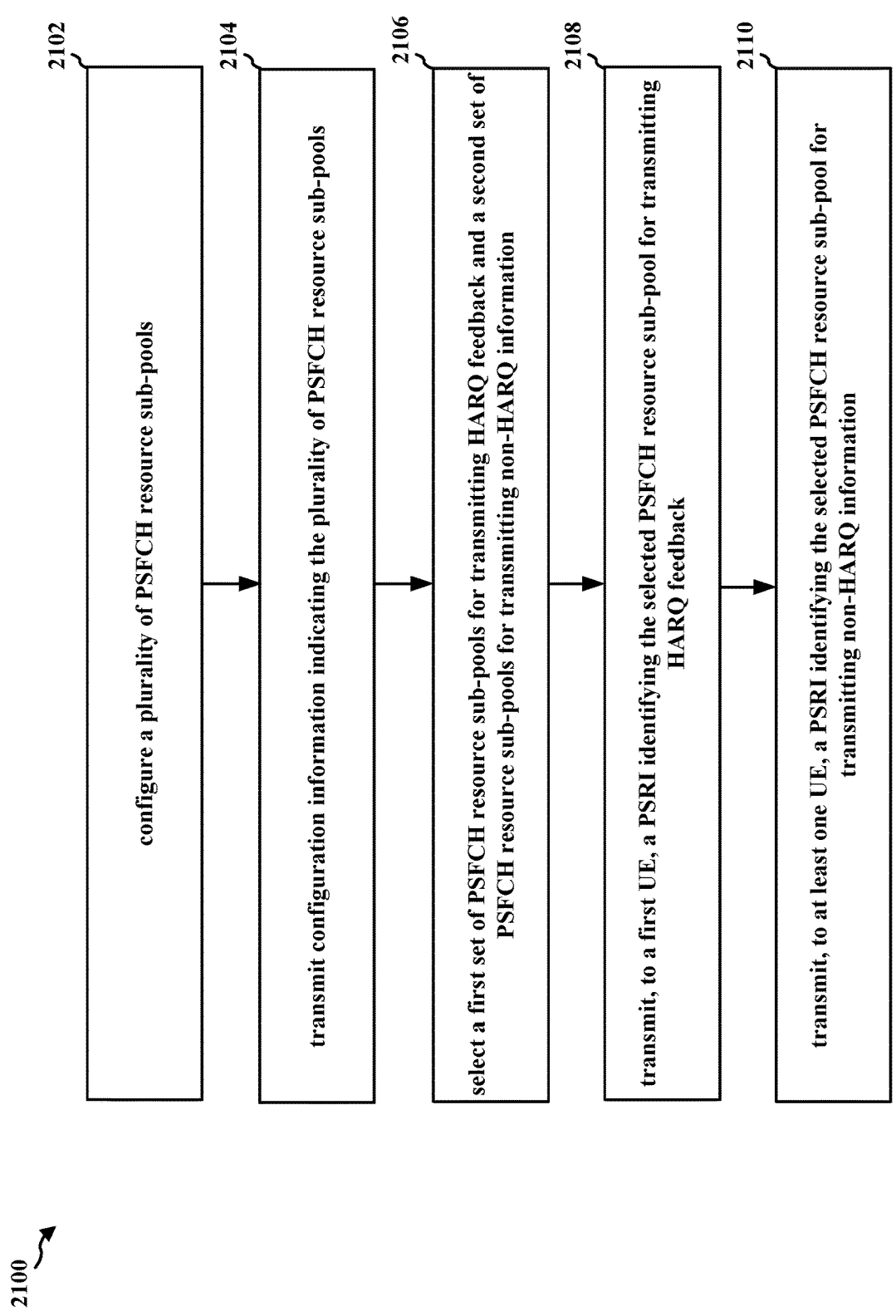
FIG. 21 is a flowchart of a method of wireless communication.

FIG. 21 is a flowchart 2100 of a method of wireless communication. The method may be performed by a base station (e.g., the base station 102, 1002, and/or 1102; the apparatus 2302). At 2102, the device may configure a plurality of PSFCH resource sub-pools. For example, referring to FIG. 9, the device may configure a plurality of PSFCH resource sub-pools associated with a plurality of PSRIs (e.g., three-digit indicators as described in relation to in L3 (pre-)configuration 960). For example, 2102 may be performed by PSFCH resource sub-pool configuration component 2340.

For example, the configured plurality of PSFCH resource sub-pools may be a plurality of PSFCH resource sub-pools for transmitting HARQ feedback (e.g., PSFCH resource sub-pools indicated by any of the three-digit PSRIs {000, 001, . . . , 110} indicated in FIG. 9) and the plurality of PSFCH resource sub-pools may include PSFCH resource sub-pools defined at different levels of PSFCH resource pool partitioning. The different levels of PSFCH resource pool partitioning may include at least a first-level ("$0^{th}$ level" partitioning 920) defining a PSFCH resource sub-pool that includes all the resources in the PSFCH resource pool, a second-level partitioning ("$1^{st}$ level" partitioning 930) defining a set of non-overlapping PSFCH resource sub-pools that each include half of the PSFCH resources in the PSFCH resource pool, and a third-level partitioning ("$2^{nd}$ level" partitioning 940) defining a set of non-overlapping PSFCH resource sub-pools that each include one quarter of the PSFCH resources in the PSFCH resource pool. The particular PSFCH resource sub-pool may be a particular PSFCH resource sub-pool defined at one of the first partitioning level, the second partitioning level, or the third partitioning level.

At 2104, the device may transmit configuration information indicating the plurality of configured PSFCH resource sub-pools to at least one UE. For example, referring to FIGS., 9 and 11, a base station 1102 may transmit L3 configuration 960 as PSFCH resource sub-pool configuration 1110 to at least one UE (e.g., UEs 1104 and 1106). The PSFCH resource sub-pool configuration 1110 may be transmitted via RRC signaling or via a SIB (e.g., L3 signaling). For example, 2104 may be performed by PSFCH resource sub-pool configuration component 2344.

At 2106, the base station may select a first set of PSFCH resource sub-pools for transmitting HARQ feedback and a second set of PSFCH resource sub-pools for transmitting non-HARQ information. The first and second set of PSFCH resource sub-pools may be selected from a plurality of PSFCH resource sub-pools of a PSFCH resource pool. For example, referring to FIG. 11, the base station may allocate 1114 a PSSCH resource (e.g., sub-channel(s) and slot(s)) for the SL transmission. The base station 1102 may further allocate a PSFCH resource sub-pool and/or a virtual 8-bit L1 source ID. The base station may allocate a PSFCH resource sub-pool based on multiple requests for SL resources from multiple devices. For example, if a large number of requests are made for SL transmissions within a same time interval (e.g., a set of slots), the base station 1102 may perform spatial reuse of PSSCH resources such that at least one set of two (or more) devices that are separated by a threshold distance or by intervening objects blocking SL transmissions may be allocated a same PSSCH resource (as described above in relation to FIG. 10). In order to avoid a HARQ feedback collision, the base station 1102 may determine whether the 8-bit L1 source IDs of the two devices are the same. If the 8-bit L1 source IDs are the same, the base station may allocate different PSFCH resource sub-pools to each of the two devices. Alternatively, or additionally, the base station 1102 may generate a virtual 8-bit L1 source ID for one or both of the devices to avoid a HARQ collision. For example, 2106 may be performed by PSFCH resource selection component 2342.

The allocation of either (1) different PSFCH resource sub-pools or (2) at least one virtual 8-bit L1 source ID may be based on the traffic type of the SL transmissions for which resources are requested. For example, if SL transmissions from both devices are associated with an ACK/NACK groupcast, the base station may allocate different PSFCH resource sub-pools to allow for each group to use all the available PSFCH resources in the different PSFCH resource sub-pools without HARQ feedback collisions. If SL transmissions from both devices are associated with an unicast or NACK-only groupcast, the base station may allocate a same PSFCH resource sub-pool and generate a virtual 8-bit L1 source ID for at least one device that is different from the 8-bit L1 source ID (virtual or unmodified) of the other device to avoid HARQ feedback collisions while allowing other PSFCH resource sub-pools to be used for other ACK/NACK groupcast transmissions or to be repurposed for other (non-HARQ feedback) types of transmissions (e.g., low-bit control information).

In some aspects, e.g., when a first device is requesting SL resources for a unicast transmission and a second device is requesting SL resources for transmission of an ACK/NACK groupcast, the base station 1102 may allocate the same PSFCH resource sub-pool to both devices and assign a virtual 8-bit L1 source ID to one of the devices to minimize the likelihood of a HARQ feedback collision. For example, the first (or second) device may be assigned a virtual 8-bit L1 source ID that is one below (or above) the 8-bit L1 source ID of the second (or first) device. By assigning such a virtual 8-bit L1 source ID, the resources selected by the group members associated with the groupcast transmission can lead to a HARQ feedback collision if the number of devices associated with the groupcast (e.g., groupcast members) is at least as large as the number of resources in the (shared) PSFCH resource sub-pool. A similar use of virtual 8-bit L1 source IDs may be employed for devices with known group sizes associated with an ACK/NACK groupcast, such that a virtual 8-bit L1 source ID may be assigned to one or both devices such that the virtual IDs are separated by at least as many members of the group associated with the device assigned the lower virtual ID.

At 2108, the base station may transmit, to a first UE, a PSRI indicating the selected PSFCH resource sub-pool for transmitting the HARQ feedback. The base station may also transmit resource allocation information that may include a SL resource allocation for a PSSCH/PSCCH and may also include a virtual 8-bit L1 source ID as described above in relation to FIG. 11. The resource allocation information may be transmitted through a L1 message (e.g., via DCI such as DCI 3-0). In some aspects, the PSRI may be indicated by a combination of a first CCE for PDCCH reception and a partial PSRI in a DCI (e.g., DCI 3-0) payload. For example, referring to FIG. 11, base station 1102 may transmit SL resource allocation with PSRI and/or virtual L1 source ID 1116 to UE 1104. For example, 2108 may be performed by PSFCH resource transmission component 2344.

At 2110, the base station may transmit, to at least one UE, a PSRI identifying the selected PSFCH resource sub-pool for transmitting non-HARQ information. The resource allocation information may be transmitted through a L1 message (e.g., via DCI such as DCI 3-0). In some aspects, the PSRI may be indicated by a combination of a first CCE for PDCCH reception and a partial PSRI in a DCI (e.g., DCI 3-0) payload. For example, referring to FIG. 11, base station 1102 may transmit SL resource allocation with PSRI and/or virtual L1 source ID 1116 including a PSRI associated with a PSFCH resource sub-pool that has been repurposed for other (non-HARQ feedback) types of transmissions (e.g., low-bit control information) to UE 1104. For example, 2110 may be performed by PSFCH resource transmission component 2344.

Figure 22:
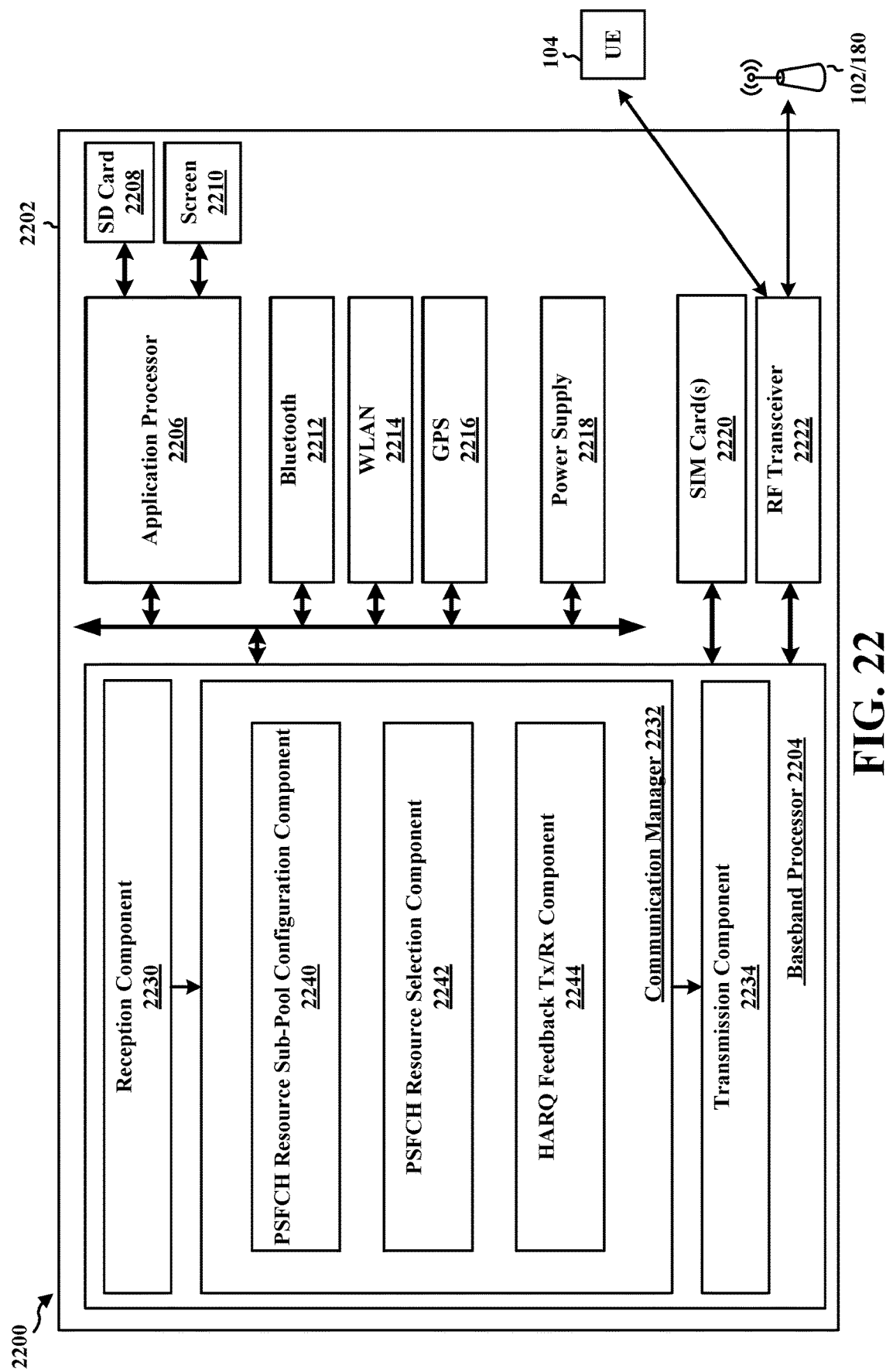
FIG. 22 is a diagram illustrating an example of a hardware implementation for an example apparatus.

FIG. 22 is a diagram 2200 illustrating an example of a hardware implementation for an apparatus 2202. The apparatus 2202 may be a UE, a component of a UE, or may implement UE functionality. In some aspects, the apparatus 2202 may include a cellular baseband processor 2204 (also referred to as a modem) coupled to a cellular RF transceiver 2222. In some aspects, the apparatus 2202 may further include one or more subscriber identity modules (SIM) cards 2220, an application processor 2206 coupled to a secure digital (SD) card 2208 and a screen 2210, a Bluetooth module 2212, a wireless local area network (WLAN) module 2214, a Global Positioning System (GPS) module 2216, or a power supply 2218. The cellular baseband processor 2204 communicates through the cellular RF transceiver 2222 with the UE 104 and/or BS 102/180. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the cellular baseband processor 2204. The cellular baseband processor 2204 may be a component of the UE 350 and may include the memory 360 and/or at least one of the TX processor 368, the RX processor 356, and the controller/processor 359. In one configuration, the apparatus 2202 may be a modem chip and include just the baseband processor 2204, and in another configuration, the apparatus 2202 may be the entire UE (e.g., see 350 of FIG. 3) and include the additional modules of the apparatus 2202.

The communication manager 2232 includes a PSFCH resource sub-pool configuration component 2240 that is configured to receive configuration information indicating a plurality of PSFCH resource sub-pools, e.g., as described in connection with 1402, 1502, and 1802 of FIGS. 14, 15, and 18. The communication manager 2232 further includes a PSFCH resource selection component 2242 that may receive input in the form of the indication of the plurality of PSFCH resource sub-pools from the component 2240 and, in some aspects, a PSRI and/or virtual L1 source ID from a base station and is configured to select, from the plurality of PSFCH resource sub-pools of a PSFCH resource pool for receiving HARQ feedback, a particular PSFCH resource sub-pool for receiving HARQ feedback associated with a particular SL transmission, e.g., as described in connection with 1302, 1304, 1404-1410, 1510, 1512, 1602 and 1604 of FIGS. 13-16. The PSFCH resource selection component 2242 may also be configured to determine a first set of reserved sub-channels in a selection window with reserved resources for SL communication that are associated with a PSRI indicating a PSFCH resource sub-pool defined at or below a first threshold level of partitioning, determine a second set of reserved sub-channels in the selection window with reserved resources for SL communication based on a set of criteria related to an associated set of PSRIs and threshold RSRPs, select a sub-channel for transmitting the particular SL transmission from a set of unreserved sub-channels in the selection window that does not include the first set of reserved sub-channels, e.g., as described in connection with 1504-1508 of FIG. 15. The PSFCH resource selection component 2242 may also be configured to receive, from a transmitting UE, a PSRI identifying a particular PSFCH resource sub-pool of a PSFCH resource pool for receiving HARQ feedback, the PSRI associated with a particular SL transmission from the transmitting UE; receive a L1 source ID associated with the UE transmitting the particular SL transmission; and to select a resource in the PSFCH resource sub-pool indicated by the PSRI for transmitting HARQ feedback associated with the particular SL transmission, e.g., as described in connection with 1702, 1704, and 1804-1808 of FIGS. 17 and 18. The communication manager 2232 further includes a HARQ feedback reception/transmission component 2244 that receives input in the form of a selected PSRI or a selected PSFCH resource in an indicated PSRI from the PSFCH resource selection component 2242 and is configured to receive, from the at least one UE, HARQ feedback regarding the particular SL transmission, the HARQ feedback being received via resources in the PSFCH resource sub-pool indicated by the PSRI, e.g., as described in connection with 1306, 1412, 1514, and 1606 of FIGS. 13-16. The PSFCH resource selection component 2242 may be configured to transmit, to the transmitting UE, HARQ feedback via the selected PSFCH resources, e.g., as described in connection with 1706, and 1810 of FIGS. 17 and 18.

The apparatus may include additional components that perform each of the blocks of the algorithm in the flowcharts of FIGS. 13-18. As such, each block in the flowcharts of FIGS. 13-18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the cellular baseband processor 2204, includes means for selecting, from a plurality of PSFCH resource sub-pools of a PSFCH resource pool for receiving HARQ feedback, a particular PSFCH resource sub-pool for receiving HARQ feedback associated with a particular SL transmission. The apparatus 2202, and in particular the cellular baseband processor 2204, may also include means for transmitting, to at least one UE, a PSRI identifying the particular PSFCH resource sub-pool. The apparatus 2202, and in particular the cellular baseband processor 2204, may also include means for receiving, from the at least one UE, HARQ feedback regarding the particular SL transmission, the HARQ feedback being received via resources in the PSFCH resource sub-pool indicated by the PSRI. The apparatus 2202, and in particular the cellular baseband processor 2204, may also include means for receiving configuration information indicating the plurality of PSFCH resource sub-pools. The apparatus 2202, and in particular the cellular baseband processor 2204, may also include means for transmitting, to a base station, a request for a resource allocation for (1) the particular SL transmission and (2) a corresponding HARQ feedback. The apparatus 2202, and in particular the cellular baseband processor 2204, may also include means for receiving, from the base station via a L1 signal, resource allocation information indicating the particular PSFCH resource sub-pool. The apparatus 2202, and in particular the cellular baseband processor 2204, may also include means for at least one of (1) receiving at least one PSRI from at least one UE via a SL transmission during a sensing window of a reservation operation associated with the particular SL transmission, or (2) determining a number of UEs associated with the particular SL transmission for which a PSFCH resource sub-pool is used for transmitting HARQ feedback, where the particular PSFCH resource sub-pool is selected based on at least one of the received at least one PSRI or the determined number of UEs associated with the particular SL transmission. The apparatus 2202, and in particular the cellular baseband processor 2204, may also include means for determining a first set of reserved sub-channels in a selection window with reserved resources for SL communication that are associated with a PSRI indicating a PSFCH resource sub-pool defined at or below a first threshold level of partitioning. selecting, from a plurality of PSFCH resource sub-pools of a PSFCH resource pool associated with the selected sub-channel, the particular PSFCH resource sub-pool for receiving HARQ feedback. The apparatus 2202, and in particular the cellular baseband processor 2204, may also include means for selecting a sub-channel for transmitting the particular SL transmission from a set of unreserved sub-channels in the selection window that does not include the first set of reserved sub-channels. The apparatus 2202, and in particular the cellular baseband processor 2204, may also include means for selecting, from a plurality of PSFCH resource sub-pools of a PSFCH resource pool associated with the selected sub-channel, the particular PSFCH resource sub-pool for receiving HARQ feedback. The apparatus 2202, and in particular the cellular baseband processor 2204, may also include means for determining a second set of reserved sub-channels in the selection window with reserved resources for SL communication that are (1) associated with a PSRI indicating a PSFCH resource sub-pool defined at a level of partitioning that is at or below a second threshold level of partitioning and above the first threshold level of partitioning, and (2) associated with a reference signal received power (RSRP) that is above a first threshold RSRP. The apparatus 2202, and in particular the cellular baseband processor 2204, may also include means for receiving a virtual L1 source ID. The apparatus 2202, and in particular the cellular baseband processor 2204, may also include means for transmitting, to the at least one UE, the virtual L1 source ID. The apparatus 2202, and in particular the cellular baseband processor 2204, may also include means for receiving, from the at least one UE, HARQ feedback regarding a particular SL transmission, the HARQ feedback being received via resources based on the virtual L1 source ID. The apparatus 2202, and in particular the cellular baseband processor 2204, may also include means for receiving, from a transmitting UE, a PSRI identifying a particular PSFCH resource sub-pool of a PSFCH resource pool for receiving HARQ feedback, the PSRI associated with a particular SL transmission from the transmitting UE. The apparatus 2202, and in particular the cellular baseband processor 2204, may also include means for selecting a resource in the PSFCH resource sub-pool indicated by the PSRI for transmitting HARQ feedback associated with the particular SL transmission. The apparatus 2202, and in particular the cellular baseband processor 2204, may also include means for transmitting, to the transmitting UE, the HARQ feedback via the selected resources. The apparatus 2202, and in particular the cellular baseband processor 2204, may also include means for receiving a L1 source ID associated with the UE transmitting the particular SL transmission. The means may be one or more of the components of the apparatus 2202 configured to perform the functions recited by the means. As described supra, the apparatus 2202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 23:
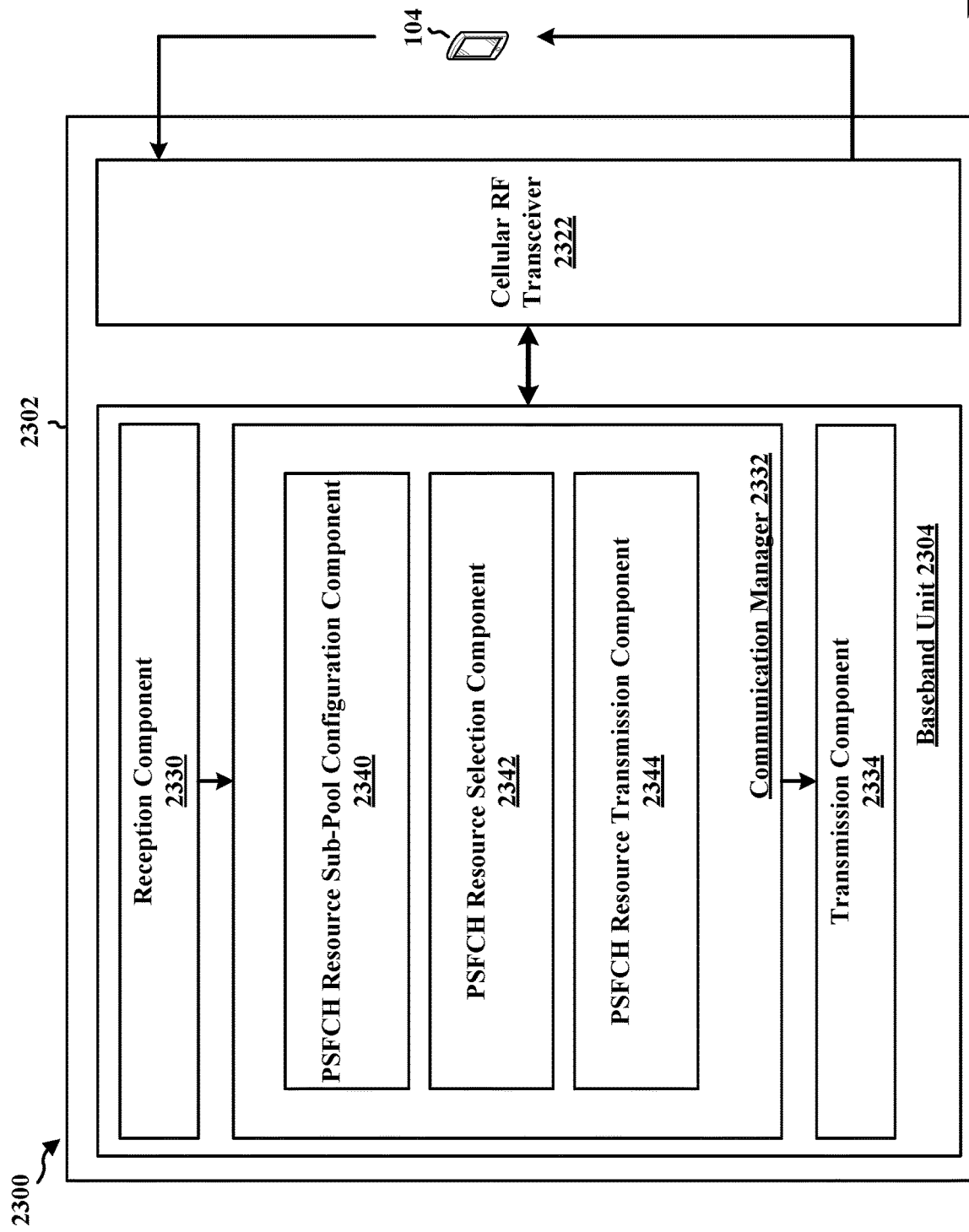
FIG. 23 is a diagram illustrating an example of a hardware implementation for an example apparatus.

FIG. 23 is a diagram 2300 illustrating an example of a hardware implementation for an apparatus 2302. The apparatus 2302 may be a base station, a component of a base station, or may implement base station functionality. In some aspects, the apparatus 2202 may include a baseband unit 2304. The baseband unit 2304 may communicate through a cellular RF transceiver 2322 with the UE 104. The baseband unit 2304 may include a computer-readable medium/memory. The baseband unit 2304 is responsible for general processing, including the execution of software stored on the computer-readable medium/memory. The software, when executed by the baseband unit 2304, causes the baseband unit 2304 to perform the various functions described supra. The computer-readable medium/memory may also be used for storing data that is manipulated by the baseband unit 2304 when executing software. The baseband unit 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the baseband unit 2304. The baseband unit 2304 may be a component of the base station 310 and may include the memory 376 and/or at least one of the TX processor 316, the RX processor 370, and the controller/processor 375.

The communication manager 2332 includes a PSFCH resource sub-pool configuration component 2340 that may configure a plurality of PSFCH resource sub-pools, e.g., as described in connection with 2002 and 2102 of FIGS. 21 and 22. The communication manager 2332 further includes a PSFCH resource selection component 2342 that may be configured to receive, from a UE, a request for a resource allocation for (1) a particular SL transmission and (2) a corresponding HARQ feedback and select, from a plurality of PSFCH resource sub-pools of a PSFCH resource pool for receiving HARQ feedback, a particular PSFCH resource sub-pool for receiving HARQ feedback associated with the particular SL transmission, e.g., as described in connection with 1902, 1904, 2006, 2008, and 2106 of FIGS. 19-21. The communication manager 2332 further includes a PSFCH resource sub-pool configuration component 2344 that may be configured to transmit configuration information indicating the plurality of configured PSFCH resource sub-pools to at least one UE; transmit, to the UE, resource allocation information indicating the particular PSFCH resource sub-pool; transmit, to a first UE, a PSRI indicating the selected PSFCH resource sub-pool for transmitting the HARQ feedback; and transmit, to at least one UE, a PSRI identifying the selected PSFCH resource sub-pool for transmitting non-HARQ information, e.g., as described in connection with 1906, 2004, 2010, 2104, 2108, and 2110 of FIGS. 19-21.

The apparatus may include additional components that perform each of the blocks of the algorithm in the flowcharts of FIGS. 19-21. As such, each block in the flowcharts of FIGS. 19-21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2302 may include a variety of components configured for various functions. In one configuration, the apparatus 2302, and in particular the baseband unit 2304, includes means for receiving, from a UE, a request for a resource allocation for (1) a particular SL transmission and (2) a corresponding HARQ feedback. The apparatus 2302, and in particular the baseband unit 2304, may include means for selecting, from a plurality of PSFCH resource sub-pools of a PSFCH resource pool for receiving HARQ feedback, a particular PSFCH resource sub-pool for receiving HARQ feedback associated with the particular SL transmission. The apparatus 2302, and in particular the baseband unit 2304, may include means for transmitting, to a UE, a PSRI identifying the particular PSFCH resource sub-pool. The apparatus 2302, and in particular the baseband unit 2304, may include means for configuring a plurality of PSFCH resource sub-pools. The apparatus 2302, and in particular the baseband unit 2304, may include means for transmit configuration information indicating the plurality of configured PSFCH resource sub-pools to at least one UE. The apparatus 2302, and in particular the baseband unit 2304, may include means for selecting a first set of PSFCH resource sub-pools for transmitting HARQ feedback and a second set of PSFCH resource sub-pools for transmitting non-HARQ information. The apparatus 2302, and in particular the baseband unit 2304, may include means for transmitting, to a first UE, a PSRI indicating the selected PSFCH resource sub-pool for transmitting the HARQ feedback. The means may be one or more of the components of the apparatus 2302 configured to perform the functions recited by the means. As described supra, the apparatus 2302 may include the TX Processor 316, the RX Processor 370, and the controller/processor 375. As such, in one configuration, the means may be the TX Processor 316, the RX Processor 370, and the controller/processor 375 configured to perform the functions recited by the means.

Some aspects of SL communication include transmitting hybrid automatic repeat request (HARQ) feedback in response to a SL transmission. A time-and-frequency resource for transmitting HARQ feedback may be selected by a receiving device based on an 8-bit layer (L1) source identifier (ID) associated with a source of a SL transmission. Resource allocation for SL transmission, in some aspects, allows for spatial reuse of time-and-frequency resources. If two source devices happen to have a same L1 source ID and be within range of a device that responds with HARQ feedback to the other device, there may be a HARQ collision (e.g., both HARQ feedback transmissions being sent via a same time-and-frequency resource). The probability of a HARQ collision for spatially reused resources may be $$\frac{1}{\text{Min}(256, N)},$$

where 256 is the number of unique 8-bit L1 source IDs and N is a number of selectable resources for transmitting HARQ feedback.

Using the nested PSFCH resource sub-pool structure described above, e.g., in relation to FIG. 9, a base station or UE may avoid or reduce the likelihood of a HARQ feedback collision for a SL transmission. Alternatively, or additionally, by assigning virtual L1 source IDs by a base station can avoid collisions between Mode 1 SL communications involving the base station. Furthermore, the nested PSFCH resource sub-pool structure may also allow for more efficient use of PSFCH, including repurposing some PSFCH resources for other (non-HARQ feedback) types of transmissions (e.g., low-bit control information). The resource allocation, including PSFCH resource sub-pool allocation, may be dynamically adjusted based on current conditions (e.g., an amount of SL traffic, an amount of control information, etc.).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is an apparatus for wireless communication including at least one processor coupled to a memory and configured to: select, from PSFCH resource sub-pools of a PSFCH resource pool for receiving HARQ feedback, a particular PSFCH resource sub-pool for receiving HARQ feedback associated with a particular SL transmission; transmit, to at least one UE, a PSRI identifying the particular PSFCH resource sub-pool; and receive, from the at least one UE, HARQ feedback regarding the particular SL transmission, the HARQ feedback being received via resources in the PSFCH resource sub-pool indicated by the PSRI.

Aspect 2 is the apparatus of aspect 1, where the plurality of PSFCH resource sub-pools for receiving HARQ feedback includes PSFCH resource sub-pools defined at different levels of PSFCH resource pool partitioning, the different levels including at least a first-level partitioning defining a PSFCH resource sub-pool that includes all the resources in the PSFCH resource pool, a second-level partitioning defining a set of non-overlapping PSFCH resource sub-pools that each include half of the PSFCH resources in the PSFCH resource pool, and a third-level partitioning defining a set of non-overlapping PSFCH resource sub-pools that each include one quarter of the PSFCH resources in the PSFCH resource pool, where the particular PSFCH resource sub-pool is a particular PSFCH resource sub-pool defined at one of the first partitioning level, the second partitioning level, or the third partitioning level.

Aspect 3 is the apparatus of aspect 2, where the at least one processor is further configured to receive configuration information indicating the plurality of PSFCH resource sub-pools.

Aspect 4 is the apparatus of aspect 3, where the configuration information is preconfigured or received via a L3 signal.

Aspect 5 is the apparatus of any of aspects 2 to 4, where, to select the particular PSFCH resource sub-pool, the at least one processor is further configured to transmit, to a base station, a request for a resource allocation for (1) the particular SL transmission and (2) a corresponding HARQ feedback and receive, from the base station via a L1 signal, resource allocation information indicating the particular PSFCH resource sub-pool.

Aspect 6 is the apparatus of aspect 5, where the resource allocation information is received via DCI.

Aspect 7 is the apparatus of any of aspects 5 or 6, where the request includes at least one of an indication of (1) a requested PSFCH resource sub-pool partitioning level, where the requested level of partitioning is one of the first partitioning level, the second partitioning level, or the third partitioning level, and where the requested level of partitioning is based on a traffic characteristic of the particular SL transmission or (2) the traffic characteristic of particular SL transmission related to a traffic characteristic criteria on which the base station bases an allocation of the particular PSFCH resource sub-pool.

Aspect 8 is the apparatus of aspect 7, where the traffic characteristic of the particular SL transmission includes at least one of (1) a number of UEs associated with the particular SL transmission, or (2) a traffic type, where the traffic type is one of unicast, groupcast, or broadcast.

Aspect 9 is the apparatus of any of aspects 1 to 4, where, to select the particular PSFCH resource sub-pool, the at least one processor is further configured to autonomously select the particular PSFCH resource sub-pool for a mode 2 SL communication with the at least one UE.

Aspect 10 is the apparatus of aspect 9, where, to select the particular PSFCH resource sub-pool, the at least one processor is further configured to at least one of (1) receive at least one PSRI from at least one UE via a SL transmission during a sensing window of a reservation operation associated with the particular SL transmission, or (2) determine a number of UEs associated with the particular SL transmission for which a PSFCH resource sub-pool is used for transmitting HARQ feedback, where the particular PSFCH resource sub-pool is selected based on at least one of the received at least one PSRI or the determined number of UEs associated with the particular SL transmission.

Aspect 11 is the apparatus of aspect 10, where the particular PSFCH resource sub-pool includes a PSFCH resource sub-pool that does not overlap with a PSFCH resource sub-pool indicated by the at least one received PSRI.

Aspect 12 is the apparatus of any of aspects 9 to 11, where the particular PSFCH resource sub-pool is selected based on a determined number of UEs associated with the particular SL transmission for which a PSFCH resource sub-pool is used for transmitting HARQ feedback.

Aspect 13 is the apparatus of any of aspects 9 to 12, where, to autonomously select the particular PSFCH resource sub-pool, the at least one processor is further configured to determine a first set of reserved sub-channels in a selection window with reserved resources for SL communication that are associated with a PSRI indicating a PSFCH resource sub-pool defined at or below a first threshold level of partitioning, select a sub-channel for transmitting the particular SL transmission from a set of unreserved sub-channels in the selection window that does not include the first set of reserved sub-channels, and select, from a plurality of PSFCH resource sub-pools of a PSFCH resource pool associated with the selected sub-channel, the particular PSFCH resource sub-pool for receiving HARQ feedback.

Aspect 14 is the apparatus of aspect 13, where the at least one processor is further configured to determine a second set of reserved sub-channels in the selection window with reserved resources for SL communication that are (1) associated with a PSRI indicating a PSFCH resource sub-pool defined at a level of partitioning that is at or below a second threshold level of partitioning and above the first threshold level of partitioning, and (2) associated with a reference signal received power (RSRP) that is above a first threshold RSRP, where the set of unreserved sub-channels does not include the second set of reserved sub-channels, and where the first set of reserved sub-channels is associated with at least one of (1) an RSRP that is above a second threshold RSRP that is less than the first threshold RSRP or (2) an RSRP that is measurable by the UE.

Aspect 15 is the apparatus of any of aspects 1 to 14, where for each UE of the at least one UE the HARQ feedback is received via resources identified based on a hashing function based on (1) the PSRI, (2) a L1 source identifier ID associated with the UE transmitting the particular SL transmission, and (3) a value associated with the UE of the at least one UE.

Aspect 16 is the apparatus of aspect 15, where the at least one processor is further configured to receive a virtual L1 source ID and transmit, to the at least one UE, the virtual L1 source ID, where the L1 source ID associated with the UE transmitting the particular SL transmission is the virtual L1 source ID.

Aspect 17 is the apparatus of aspect 16, where the virtual L1 source ID is received from a base station via DCI.

Aspect 18 is the apparatus of any of aspects 1 to 17, where the PSRI is transmitted via at least one of SCI or a physical SL shared channel.

Aspect 19 is an apparatus for wireless communication including at least one processor coupled to a memory and configured to receive, from a transmitting UE, a PSRI identifying a particular PSFCH resource sub-pool of a PSFCH resource pool for receiving HARQ feedback, the PSRI associated with a particular SL transmission from the transmitting UE; select a resource in the PSFCH resource sub-pool indicated by the PSRI for transmitting HARQ feedback associated with the particular SL transmission; and transmit, to the transmitting UE, the HARQ feedback via the selected resources.

Aspect 20 is the apparatus of aspect 19, where the particular PSFCH resource sub-pool is one of a plurality of PSFCH resource sub-pools for transmitting HARQ feedback and the plurality of PSFCH resource sub-pools includes PSFCH resource sub-pools defined at different levels of PSFCH resource pool partitioning, the different levels including at least a first-level partitioning defining a PSFCH resource sub-pool that includes all the resources in the PSFCH resource pool, a second-level partitioning defining a set of non-overlapping PSFCH resource sub-pools that each include half of the PSFCH resources in the PSFCH resource pool, and a third-level partitioning defining a set of non-overlapping PSFCH resource sub-pools that each include one quarter of the PSFCH resources in the PSFCH resource pool, where the particular PSFCH resource sub-pool is a particular PSFCH resource sub-pool defined at one of the first partitioning level, the second partitioning level, or the third partitioning level.

Aspect 21 is the apparatus of aspect 20, where the at least one processor is further configured to receive configuration information indicating the plurality of PSFCH resource sub-pools.

Aspect 22 is the apparatus of aspect 21, where the configuration information is preconfigured or received via a L3 signal and the PSRI is received via a L1 signal.

Aspect 23 is the apparatus of any of aspects 19 to 22, where the at least one processor is further configured to receive a L1 source ID associated with the UE transmitting the particular SL transmission, where selecting the resource in the PSFCH resource sub-pool is based on a hashing function based on (1) the PSRI, (2) the received L1 source ID, and (3) a value associated with the UE.

Aspect 24 is the apparatus of aspect 23, where the received L1 source ID is a virtual L1 source ID.

Aspect 25 is an apparatus for wireless communication including at least one processor coupled to a memory and configured to receive a virtual L1 source ID; transmit, to at least one UE, an indication of the virtual L1 source ID; and receive, from the at least one UE, HARQ feedback regarding a particular SL transmission, the HARQ feedback being received via resources based on the virtual L1 source ID.

Aspect 26 is an apparatus for wireless communication including at least one processor coupled to a memory and configured to receive, from a UE, a request for a resource allocation for (1) a particular SL transmission and (2) a corresponding HARQ feedback; select, from a plurality of PSFCH resource sub-pools of a PSFCH resource pool for receiving HARQ feedback, a particular PSFCH resource sub-pool for receiving HARQ feedback associated with the particular SL transmission; and transmit, to a UE, a PSRI identifying the particular PSFCH resource sub-pool.

Aspect 27 is a method of wireless communication for implementing any of aspects 1 to 26.

Aspect 28 is an apparatus for wireless communication including means for implementing any of aspects 1 to 26.

Aspect 29 is a computer-readable medium storing computer executable code, where the code when executed by a processor causes the processor to implement any of aspects 1 to 26.

What is claimed is:

1. An apparatus for wireless communication, comprising:
    memory; and
    at least one processor coupled to the memory and configured to:
        select, from an indexed plurality of physical sidelink (SL) feedback channel (PSFCH) resource sub-pools comprising PSFCH resource sub-pools defined at a plurality of different levels of PSFCH resource pool partitioning of a PSFCH resource pool for receiving hybrid automatic repeat request (HARQ) feedback, a particular PSFCH resource sub-pool for receiving HARQ feedback associated with a particular SL transmission;
        transmit, to at least one user equipment (UE), a PSFCH sub-pool resource indication (PSRI) identifying the particular PSFCH resource sub-pool via an index associated with the particular PSFCH resource sub-pool; and
        receive, from the at least one UE, the HARQ feedback regarding the particular SL transmission via a PSFCH resource in the particular PSFCH resource sub-pool indicated by the PSRI.

2. The apparatus of claim 1, wherein the plurality of different levels of PSFCH resource pool partitioning comprises at least:
    a first partitioning level defining a PSFCH resource sub-pool that comprises all of a plurality of PSFCH resources in the PSFCH resource pool;
    a second partitioning level defining a first set of non-overlapping PSFCH resource sub-pools that each comprise half of the plurality of PSFCH resources in the PSFCH resource pool; and
    a third partitioning level defining a second set of non-overlapping PSFCH resource sub-pools that each comprise one quarter of the plurality of PSFCH resources in the PSFCH resource pool, wherein the particular PSFCH resource sub-pool is defined at one of the first partitioning level, the second partitioning level, or the third partitioning level.

3. The apparatus of claim 2, wherein the at least one processor is further configured to receive configuration information indicating the plurality of PSFCH resource sub-pools defined at the plurality of different levels of PSFCH resource pool partitioning.

4. The apparatus of claim 3, wherein the configuration information is preconfigured or received via a layer 3 (L3) signal.

5. The apparatus of claim 2, wherein, to select the particular PSFCH resource sub-pool, the at least one processor is further configured to:
- transmit, to a base station, a request for a resource allocation for (1) the particular SL transmission and (2) a corresponding HARQ feedback; and
- receive, from the base station via a layer 1 (L1) signal, resource allocation information indicating the particular PSFCH resource sub-pool.

6. The apparatus of claim 5, wherein to receive the resource allocation information, the at least one processor is configured to receive the resource allocation information via downlink control information (DCI).

7. The apparatus of claim 5, wherein the request comprises at least one of an indication of:
- (1) a requested PSFCH resource sub-pool partitioning level,
  - wherein the requested PSFCH resource sub-pool partitioning level is one of the first partitioning level, the second partitioning level, or the third partitioning level, and
  - wherein the requested PSFCH resource sub-pool partitioning level is based on a traffic characteristic of the particular SL transmission; or
- (2) the traffic characteristic of the particular SL transmission related to a traffic characteristic criteria on which the base station bases an allocation of the particular PSFCH resource sub-pool.

8. The apparatus of claim 7, wherein the traffic characteristic of the particular SL transmission comprises at least one of (1) a number of UEs associated with the particular SL transmission, or (2) a traffic type, wherein the traffic type is one of unicast, groupcast, or broadcast.

9. The apparatus of claim 1, wherein, to select the particular PSFCH resource sub-pool, the at least one processor is further configured to autonomously select the particular PSFCH resource sub-pool for a mode 2 SL communication with the at least one UE.

10. The apparatus of claim 9, wherein, to select the particular PSFCH resource sub-pool, the at least one processor is further configured to at least one of (1) receive at least one PSRI from at least one UE via a SL transmission during a sensing window of a reservation operation associated with the particular SL transmission, or (2) determine a number of UEs associated with the particular SL transmission for which the particular PSFCH resource sub-pool is used for transmitting the HARQ feedback, wherein to select the particular PSFCH resource sub-pool, the at least one processor is configured to select the particular PSFCH resource sub-pool based on at least one of the at least one PSRI or the number of UEs associated with the particular SL transmission.

11. The apparatus of claim 10, wherein the particular PSFCH resource sub-pool does not overlap with an additional PSFCH resource sub-pool indicated by the at least one PSRI.

12. The apparatus of claim 9, wherein to select the particular PSFCH resource sub-pool, the at least one processor is configured to select the particular PSFCH resource sub-pool based on a determined number of UEs associated with the particular SL transmission for which the particular PSFCH resource sub-pool is used for transmitting the HARQ feedback.

13. The apparatus of claim 9, wherein, to autonomously select the particular PSFCH resource sub-pool, the at least one processor is further configured to:
- determine a first set of reserved sub-channels in a selection window with reserved resources for SL communication that are associated with a second PSRI indicating a second PSFCH resource sub-pool defined at or below a first threshold level of partitioning; and
- select a sub-channel for transmitting the particular SL transmission from a set of unreserved sub-channels in the selection window that does not include the first set of reserved sub-channels, wherein the particular PSFCH resource sub-pool and the plurality of PSFCH resource sub-pools are associated with the sub-channel.

14. The apparatus of claim 13, wherein the at least one processor is further configured to determine a second set of reserved sub-channels in the selection window with second reserved resources for SL communication that are (1) associated with a third PSRI indicating a third PSFCH resource sub-pool defined at a level of partitioning that is at or below a second threshold level of partitioning and above the first threshold level of partitioning, and (2) associated with a reference signal received power (RSRP) that is above a first threshold RSRP,
- wherein the set of unreserved sub-channels does not include the second set of reserved sub-channels, and
- wherein the first set of reserved sub-channels is associated with at least one of (1) a first RSRP that is above a second threshold RSRP that is less than the first threshold RSRP or (2) a second RSRP that is measurable by the UE.

15. The apparatus of claim 1, wherein to receive the HARQ feedback, the at least one processor is configured to receive, for each UE of the at least one UE, the HARQ feedback via resources identified based on a hashing function based on (1) the PSRI, (2) a layer 1 (L1) source identifier (ID) associated with the apparatus transmitting the particular SL transmission, and (3) a value associated with the UE of the at least one UE.

16. The apparatus of claim 15, wherein the at least one processor is further configured to:
- receive a virtual L1 source ID; and
- transmit, to the at least one UE, the virtual L1 source ID, wherein the L1 source ID associated with the apparatus transmitting the particular SL transmission is the virtual L1 source ID.

17. The apparatus of claim 16, wherein to receive the virtual L1 source ID, the at least one processor is configured to receive the virtual L1 source ID from a base station via downlink control information (DCI).

18. The apparatus of claim 1, wherein to transmit the PSRI, the at least one processor is configured to transmit the PSRI via at least one of SL control information (SCI) or a physical SL shared channel.

19. The apparatus of claim 1, further comprising a transceiver coupled to the at least one processor.

20. An apparatus for wireless communication, comprising:
- memory; and
- at least one processor coupled to the memory and configured to:
  - receive, from a transmitting user equipment (UE), a physical sidelink (SL) feedback channel (PSFCH) sub-pool resource indication (PSRI) identifying a particular PSFCH resource sub-pool of a PSFCH resource pool comprising an indexed plurality of PSFCH resource sub-pools defined at a plurality of different levels of PSFCH resource pool partitioning for receiving hybrid automatic repeat request (HARQ) feedback, wherein the PSRI identifies the particular PSFCH resource sub-pool via an index associated with the particular PSFCH resource sub-pool and the PSRI is associated with a particular SL transmission from the transmitting UE;

select a PSFCH resource in the particular PSFCH resource sub-pool indicated by the PSRI for transmitting HARQ feedback associated with the particular SL transmission; and transmit, to the transmitting UE, the HARQ feedback via the selected PSFCH resource.

21. The apparatus of claim 20, wherein the plurality of different levels of PSFCH resource pool partitioning comprises at least:

a first partitioning level defining a PSFCH resource sub-pool that comprises all of a plurality of PSFCH resources in the PSFCH resource pool;

a second partitioning level defining a first set of non-overlapping PSFCH resource sub-pools that each comprise half of the plurality of PSFCH resources in the PSFCH resource pool; and a third partitioning level defining a second set of non-overlapping PSFCH resource sub-pools that each comprise one quarter of the plurality of PSFCH resources in the PSFCH resource pool, wherein the particular PSFCH resource sub-pool is defined at one of the first partitioning level, the second partitioning level, or the third partitioning level.

22. The apparatus of claim 21, wherein the at least one processor is further configured to receive configuration information indicating the plurality of PSFCH resource sub-pools defined at the plurality of different levels of PSFCH resource pool partitioning.

23. The apparatus of claim 22, wherein the configuration information is preconfigured or wherein to receive the configuration information, the at least one processor is configured to receive the configuration information via a layer 3 (L3) signal, and wherein to receive the PSRI, the at least one processor is configured to receive the PSRI via a layer 1 (L1) signal.

24. The apparatus of claim 20, wherein the at least one processor is further configured to receive a layer 1 (L1) source identifier (ID) associated with the transmitting UE, wherein selecting the PSFCH resource in the particular PSFCH resource sub-pool is based on a hashing function based on (1) the PSRI, (2) the L1 source ID, and (3) a value associated with the apparatus.

25. The apparatus of claim 24, wherein the L1 source ID is a virtual L1 source ID.

26. The apparatus of claim 20, further comprising a transceiver coupled to the at least one processor.

27. A method for wireless communication at a user equipment (UE), comprising:

selecting, from an indexed plurality of physical sidelink (SL) feedback channel (PSFCH) resource sub-pools comprising PSFCH resource sub-pools defined at a plurality of different levels of PSFCH resource pool partitioning of a PSFCH resource pool for receiving hybrid automatic repeat request (HARQ) feedback, a particular PSFCH resource sub-pool for receiving HARQ feedback associated with a particular SL transmission;

transmitting, to at least one UE, a PSFCH sub-pool resource indication (PSRI) identifying the particular PSFCH resource sub-pool via an index associated with the particular PSFCH resource sub-pool; and receiving, from the at least one UE, the HARQ feedback regarding the particular SL transmission via a PSFCH resource in the particular PSFCH resource sub-pool indicated by the PSRI.

28. The method of claim 27, wherein the plurality of different levels of PSFCH resource pool partitioning comprises at least:

a first partitioning level defining a PSFCH resource sub-pool that comprises all of a plurality of PSFCH resources in the PSFCH resource pool;

a second partitioning level defining a first set of non-overlapping PSFCH resource sub-pools that each comprise half of the plurality of PSFCH resources in the PSFCH resource pool; and a third partitioning level defining a second set of non-overlapping PSFCH resource sub-pools that each comprise one quarter of the plurality of PSFCH resources in the PSFCH resource pool, wherein the particular PSFCH resource sub-pool is defined at one of the first partitioning level, the second partitioning level, or the third partitioning level.

29. A method for wireless communication at a user equipment (UE), comprising:

receiving, from a transmitting UE, a physical sidelink (SL) feedback channel (PSFCH) sub-pool resource indication (PSRI) identifying a particular PSFCH resource sub-pool comprising an indexed plurality of PSFCH resource sub-pools defined at a plurality of different levels of PSFCH resource pool partitioning of a PSFCH resource pool for receiving hybrid automatic repeat request (HARQ) feedback, wherein the PSRI identifies the particular PSFCH resource sub-pool via an index associated with the particular PSFCH resource sub-pool and the PSRI is associated with a particular SL transmission from the transmitting UE;

selecting a PSFCH resource in the particular PSFCH resource sub-pool indicated by the PSRI for transmitting HARQ feedback associated with the particular SL transmission; and transmitting, to the transmitting UE, the HARQ feedback via the PSFCH resource.

30. The method of claim 29, wherein the plurality of different levels of PSFCH resource pool partitioning comprises at least:

a first partitioning level defining a PSFCH resource sub-pool that comprises all of a plurality of PSFCH resources in the PSFCH resource pool;

a second partitioning level defining a first set of non-overlapping PSFCH resource sub-pools that each comprise half of the plurality of PSFCH resources in the PSFCH resource pool; and a third partitioning level defining a second set of non-overlapping PSFCH resource sub-pools that each comprise one quarter of the plurality of PSFCH resources in the PSFCH resource pool, wherein the particular PSFCH resource sub-pool is defined at one of the first partitioning level, the second partitioning level, or the third partitioning level.

* * * * *